US012203640B1

(12) United States Patent
Barnett et al.

(10) Patent No.: US 12,203,640 B1
(45) Date of Patent: Jan. 21, 2025

(54) LIGHTING DEVICE WITH INTEGRATED ANTENNA AND CONTROLLER

(71) Applicant: Rave Lighting and Technology LLC, Prior Lake, MN (US)

(72) Inventors: David Allen Barnett, Minneapolis, MN (US); Ryan Jay Charon, Prior Lake, MN (US)

(73) Assignee: Rave Lighting and Technology LLC, Prior Lake, MN (US)

( * ) Notice: Subject to any disclaimer, the term of this patent is extended or adjusted under 35 U.S.C. 154(b) by 0 days.

(21) Appl. No.: 18/658,485

(22) Filed: May 8, 2024

(51) Int. Cl.

| | |
|---|---|
| ***F21V 23/04*** | (2006.01) |
| ***F21S 4/28*** | (2016.01) |
| ***F21V 15/01*** | (2006.01) |
| ***F21V 15/015*** | (2006.01) |
| ***F21V 17/00*** | (2006.01) |
| ***F21V 21/008*** | (2006.01) |
| ***F21V 23/02*** | (2006.01) |
| *F21Y 113/13* | (2016.01) |

(52) U.S. Cl.
CPC ............ *F21V 23/0435* (2013.01); *F21S 4/28* (2016.01); *F21V 15/013* (2013.01); *F21V 15/015* (2013.01); *F21V 17/002* (2013.01); *F21V 21/008* (2013.01); *F21V 23/02* (2013.01); *F21Y 2113/13* (2016.08)

(58) Field of Classification Search
CPC .... F21V 17/002; F21V 15/013; F21V 15/015; F21V 23/003; F21V 23/02; F21V 23/023; F21V 23/026; F21V 23/0435; F21S 4/28
See application file for complete search history.

(56) References Cited

U.S. PATENT DOCUMENTS

| | | | | |
|---|---|---|---|---|
| 10,299,342 | B1 * | 5/2019 | Reddy | H05B 47/175 |
| 2008/0211427 | A1 | 9/2008 | Budde et al. | |
| 2008/0259616 | A1 * | 10/2008 | Morgan | E04B 9/0485 362/404 |

(Continued)

OTHER PUBLICATIONS

"Athena—Lighting Control System with App | Lutron", accessed at https://commercial.lutron.com/us/en/whole-building-systems/athena on Nov. 3, 2023, 10 pages.

(Continued)

*Primary Examiner* — Abdulmajeed Aziz
*Assistant Examiner* — Steven Y Horikoshi
(74) *Attorney, Agent, or Firm* — Barnes & Thornburg LLP

(57) ABSTRACT

In some implementations, an integrated lighting device includes a housing that includes a lighting unit, a power supply, an antenna, and a controller. A high-voltage power cable provides high-voltage power from a high-voltage power source to the integrated lighting device. The power supply receives the high-voltage power and converts the high-voltage power into low-voltage power. The controller receives low-voltage power from the power supply, provides the low-voltage power to the lighting unit, receives control signals from the antenna that have been wirelessly received from a remote control source, and based on the control signals, provides corresponding lighting control commands to the lighting unit. The lighting unit generates lighting effects based on the lighting control commands provided by the controller, using the low-voltage power provided by the controller.

17 Claims, 13 Drawing Sheets

(56) References Cited

U.S. PATENT DOCUMENTS

| | | | | |
|---|---|---|---|---|
| 2010/0020542 | A1* | 1/2010 | Teng | F21V 15/015 362/249.05 |
| 2010/0157593 | A1* | 6/2010 | Zhou | F21V 19/0045 362/249.02 |
| 2011/0295389 | A1 | 12/2011 | McCormack | |
| 2012/0274208 | A1 | 11/2012 | Chen et al. | |
| 2013/0331038 | A1* | 12/2013 | Kusakari | G01S 5/14 455/66.1 |
| 2013/0343037 | A1* | 12/2013 | Alexander | F21V 19/0015 362/95 |
| 2014/0063790 | A1* | 3/2014 | Gold | F21V 33/0008 362/106 |
| 2014/0146542 | A1* | 5/2014 | Seward | F21V 17/18 362/297 |
| 2014/0268736 | A1* | 9/2014 | Ratkus | F21S 4/28 362/311.01 |
| 2014/0268759 | A1* | 9/2014 | Vang | F21S 8/026 362/240 |
| 2015/0345754 | A1* | 12/2015 | Sohn | F21V 17/12 362/217.05 |
| 2015/0351195 | A1 | 12/2015 | Sargent et al. | |
| 2016/0208998 | A1* | 7/2016 | Greinke | F21V 15/013 |
| 2016/0255703 | A1 | 9/2016 | Davie | |
| 2017/0318633 | A1 | 11/2017 | Zijlman et al. | |
| 2017/0356631 | A1* | 12/2017 | Satterfield | F21S 4/28 |
| 2018/0087727 | A1* | 3/2018 | Miyahara | F21K 9/20 |
| 2019/0120465 | A1* | 4/2019 | Yang | F21V 19/00 |
| 2019/0181545 | A1* | 6/2019 | Lu | H05B 47/19 |
| 2019/0309939 | A1* | 10/2019 | Hand | F21S 4/28 |
| 2020/0124255 | A1* | 4/2020 | Tran | F21V 23/0435 |
| 2020/0182437 | A1* | 6/2020 | Shaner | F21V 17/108 |
| 2021/0041086 | A1 | 2/2021 | Brand et al. | |
| 2021/0262647 | A1 | 8/2021 | De Jong et al. | |
| 2022/0243907 | A1 | 8/2022 | Bocock et al. | |
| 2022/0364717 | A1* | 11/2022 | Irons | F21V 31/005 |
| 2023/0073441 | A1* | 3/2023 | Bocock | F21V 7/0091 |

OTHER PUBLICATIONS

"Endeavor™ 120V Cove Light Fixture—Color Temperature Selectable", accessed at https://www.flexfireleds.com/endeavor-120v-cove-light/ on Nov. 7, 2023, 6 pages.
"How Philips Hue works", accessed at https://www.philips-hue.com/en-us/explore-hue/how-it-works on Nov. 3, 2023, 9 pages.
"Ketra | Human-Centric Natural Light Systems", accessed at https://www.ketra.com/ on Nov. 3, 2023, 9 pages.
"Luz Negra—Linear Lighting Solutions", accessed at https://www.luznegra.net/en on May 6, 2024, 5 pages.
Lutron home page, accessed at lutron.com/en-US/Education-Training/Pages/LCE/Technologies/EcoSystem/Features. aspx on Apr. 23, 2024, 4 pages.

* cited by examiner

LIGHTING DEVICE WITH INTEGRATED ANTENNA AND CONTROLLER

TECHNICAL FIELD

This specification generally describes technology for provided integrated lighting devices that are remotely controllable and that include features for improved ease of installation and serviceability.

BACKGROUND

In general, intelligent lighting systems can use radio frequency (RF) communication or wired communication to remotely control lighting devices that are installed in a space. The lighting devices included in such systems generally are at least partially assembled in the field during installation, based on the physical aspects of a space in which the devices are installed. Installation and serviceability of such devices can be a challenge, for example, due to variable power requirements of device components, and due to component accessibility considerations.

SUMMARY

This document describes systems and devices for providing integrated lighting solutions. In general, lighting contributes to a significant portion of a building's energy consumption, especially in commercial settings. Further, studies have shown that human productivity and focus can be enhanced by adjusting light temperatures throughout the day according to the body's natural circadian cycle. For example, cooler colors of light (e.g., as the sun generates during the late morning and early afternoon) can increase concentration and focus, whereas warmer colors of light (e.g., as the sun generates during the early morning and late afternoon) can facilitate relaxation. Through an integrated lighting solution that includes a network of connected lighting devices, the output of each light can be individually adjusted to compensate for the light being delivered from other sources (e.g., the light entering a building from a window). Thus, the integrated lighting solution can provide a consistent level of light at an appropriate light temperature throughout an interior space, while lowering overall energy consumption.

In general, the integrated lighting devices described herein can be remotely controllable (e.g., using radio frequency (RF) communication) and can include features for improved ease of installation and serviceability. For example, rather than being coupled to an external power converter that converts power from a high-voltage alternating current (AC) power source into low-voltage direct current (DC) power, each lighting device can include its own integrated power conversion unit. Further, rather than being controlled by an external controller, each lighting device can include its own integrated controller unit. The integrated power conversion unit and the integrated controller unit can each be pre-installed in the lighting device, thereby facilitating installation. Placement of the power conversion unit and the controller within the lighting device, and accessibility features of device itself, can improve serviceability of the lighting device after it has been installed.

In some implementations, an integrated lighting device can include a housing that includes, within the housing, a lighting unit, a power supply, an antenna, and a controller. A high-voltage power cable can be configured to provide high-voltage power from a high-voltage power source to the integrated lighting device. The power supply can be configured to receive the high-voltage power provided through the high-voltage power cable and to convert the high-voltage power into low-voltage power. The lighting unit can include a plurality of light emitting diodes (LEDs). The antenna can be configured to wirelessly receive control signals from a remote control source. The controller can be configured to receive low-voltage power from the power supply, provide the low-voltage power to the lighting unit, receive control signals from the antenna, and based on the control signals, provide corresponding lighting control commands to the lighting unit. The lighting unit can be configured to generate lighting effects based on the lighting control commands provided by the controller, using the low-voltage power provided by the controller.

These and other implementations can include any, all, or none of the following features. The housing can be fabricated from extruded aluminum. The housing can be fabricated from rigid fiberglass. The housing can have a substantially cuboid shape, with a length dimension being a greatest dimension of the housing, and with a height dimension and a width dimension both being lesser dimensions relative to the length dimension. The power supply and the controller can be located in an upper compartment of the housing, and the lighting unit can be located in a lower compartment of the housing that is situated below the upper compartment of the housing. The power supply and the controller can be located at opposite ends of the housing. The integrated lighting device can include a pair of removable endcaps, with each endcap being removably attached to an opposite end of the housing. The integrated lighting device can include a removable light tray structure configured to be installed within the housing, the light tray structure extending along the length of the housing, and forming the upper compartment of the housing and the lower compartment of the housing when installed. The integrated lighting device can include a removable diffuser that extends along the length of the light tray structure, and that is configured to be removably attached to the light tray structure and to cover the lighting unit. The antenna can be located in the lower compartment of the housing, in a space that is formed between the removable diffuser and the removable light tray structure. The lighting unit can be a flexible LED strip that extends along the length of the light tray structure, and is chemically adhered to the light tray structure. The lighting unit can include a series of rigid printed circuit boards (PCBs) that are mechanically coupled to the light tray structure. The housing can be fabricated from a semi-flexible material, and the removable light tray structure can have a tension fit within the housing when installed. The removable light tray structure can be mechanically coupled to the housing when installed. A mechanical coupling mechanism between the housing and the removable light tray structure can include a series of locking cams that mechanically couple the removable light tray structure to the housing. The controller can be configured to support multiple different channels of lighting control for the lighting unit, and can be configured to support dimming levels between 0.1% and 100%. The power supply, the controller, and at least a portion of the antenna can be located in a rear compartment of the housing, and the lighting unit can be located in a front compartment of the housing that is situated in a same horizontal plane as the rear compartment of the housing. The integrated lighting device can include a diffuser that covers the front compartment of the housing. The rear compartment of the housing can be covered by a panel that is fabricated from a radio frequency (RF) transparent material. The power supply and the controller can be integrated as a single component.

The systems, devices, program products, and processes described throughout this document can, in some instances, provide one or more of the following advantages. An integrated lighting solution can provide a consistent level of light at an appropriate light temperature throughout an interior space, while lowering overall energy consumption. An integrated power conversion unit and an integrated controller unit can each be pre-installed in a lighting device, thereby facilitating installation. For instance, a simplified installation can be accomplished by line-voltage electricians, thus lowering installation costs and permitting installation by electricians of varying skill sets. Further, installation of the lighting device can be possible in a broader range of physical environments relative to non-integrated devices. For instance, a two-piece lighting system that lacks integrated electronics may have a more limited range of applications, as some environments lack the space for placement of an external electronics box. Such installation scenarios can include new construction scenarios as well as retrofit scenarios in which the lighting device replaces an existing line-voltage light in locations at which dimming, tunable-white, and/or color lighting is desired. Placement of the power conversion unit and the controller within the lighting device, and accessibility features of device itself, can improve serviceability of the lighting device. Due to components of the lighting device residing within one housing (rather than being distributed among multiple devices and locations), maintenance of the lighting device can be performed more quickly and more efficiently, which can permit faster restoration after the occurrence of a failure.

Other features, aspects and potential advantages will be apparent from the accompanying description and figures.

DESCRIPTION OF DRAWINGS

Like reference symbols in the various drawings indicate like elements.

DETAILED DESCRIPTION

In general, integrated lighting devices can be provided, that are remotely controllable and that include features for improved ease of installation and serviceability. Rather than being coupled to an external power converter that converts power from a high-voltage alternating current (AC) power source into low-voltage direct current (DC) power, each lighting device can include its own integrated power conversion unit. Further, rather than being controlled by an external controller, each lighting device can include its own integrated controller unit. The integrated power conversion unit and the integrated controller unit can each be pre-installed in the lighting device, thereby facilitating installation. Placement of the power conversion unit and the controller within the lighting device, and accessibility features of device itself, can improve serviceability of the lighting device after it has been installed.

Figure 1A:
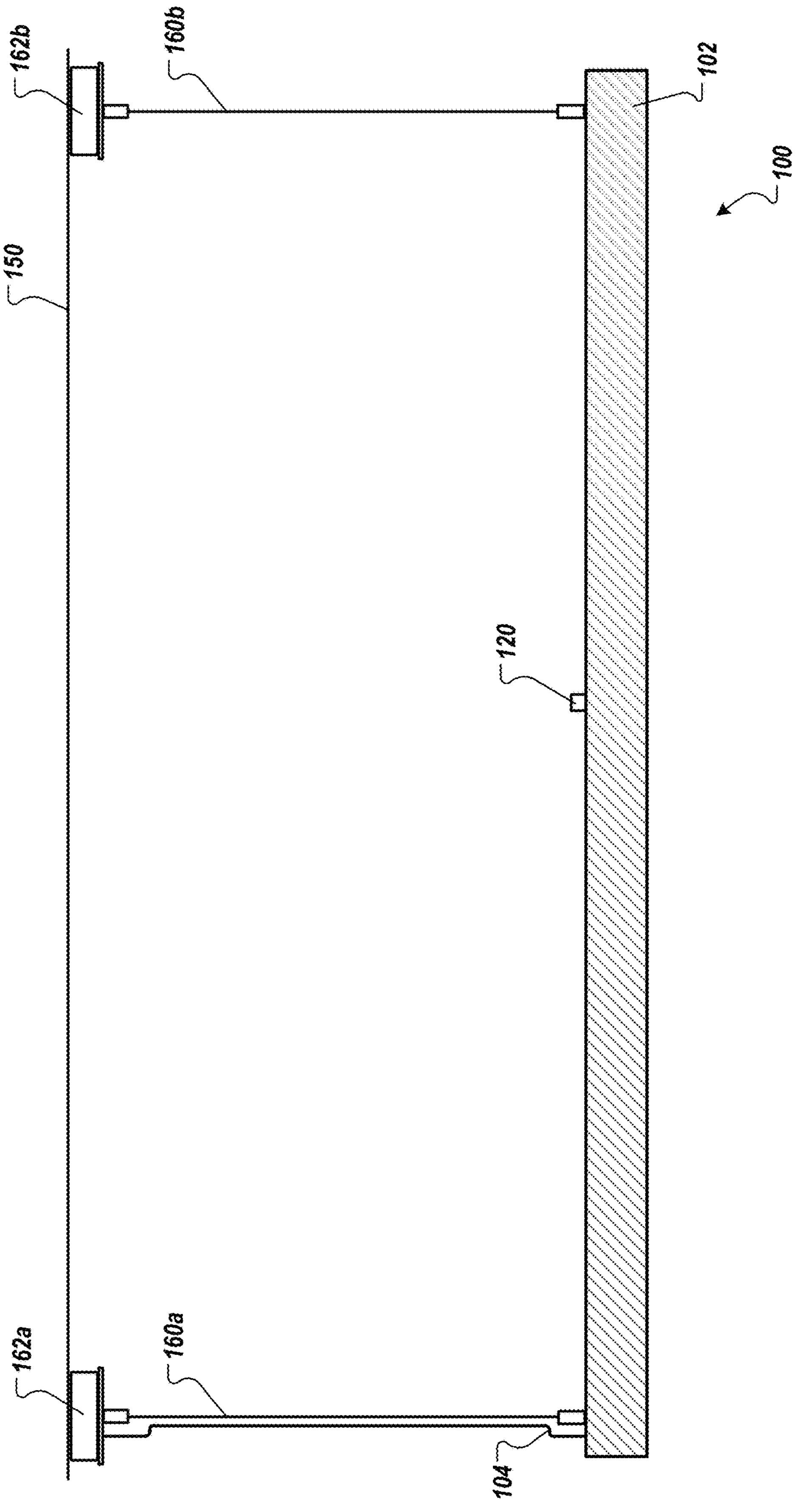
FIG. 1A is an exterior side view of an installation of an example integrated lighting device.
Figure 1B:
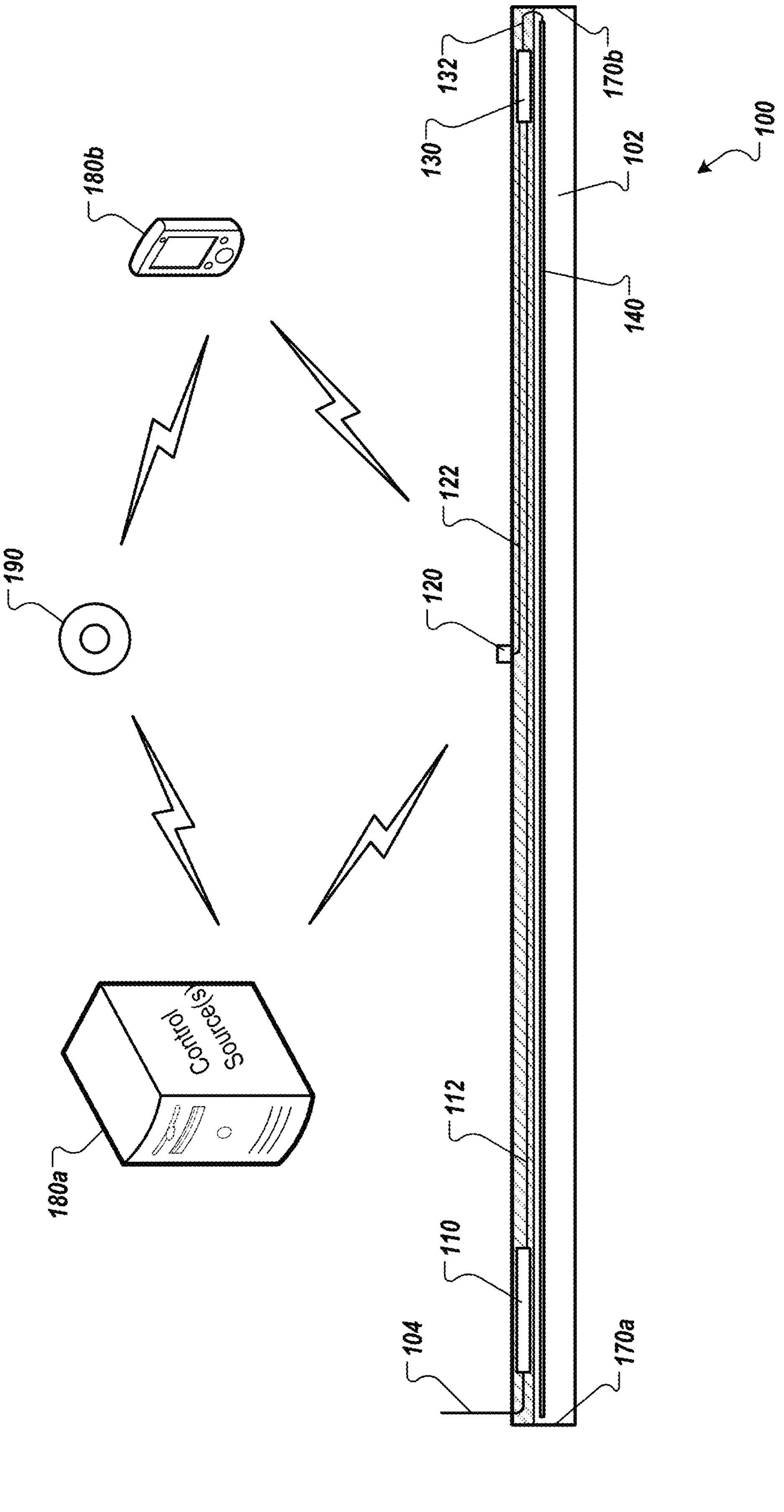
FIG. 1B is a sectional side view of an example integrated lighting device.

Referring to FIGS. 1A-1B, an example integrated lighting device 100 is shown. At a high level of detail, the integrated lighting device 100 includes a housing 102 that includes a component compartment that houses the various components of the device 100, including a power supply 110, an antenna 120, a controller 130, and a lighting unit 140. In the present example, a power cable 104 provides high-voltage AC power to the power supply 110, which converts the high-voltage AC power to low-voltage DC power. The power supply 110, for example, provides the low-voltage DC power to the controller 130 through a conductor cable 112, which provides a wired connection between the power supply 110 and the controller 130. The antenna 120, for example, can receive wireless control signals (e.g., from a remote computing device), and can provide the wireless control signals to the controller 130 through an antenna cable 122, which provides a wired connection between the antenna 120 and the controller 130. The controller 130, for example, can provide lighting control signals (e.g., based on the wireless control signals received from the antenna 120) and can also provide power to the lighting unit 140 through the lighting unit cable 132, which provides a wired connection between the controller 130 and the lighting unit 140. The lighting unit 140, for example, can generate illumination using the power received from the power supply 110, and based on the lighting control signals received from the controller 130.

Figure 9A:
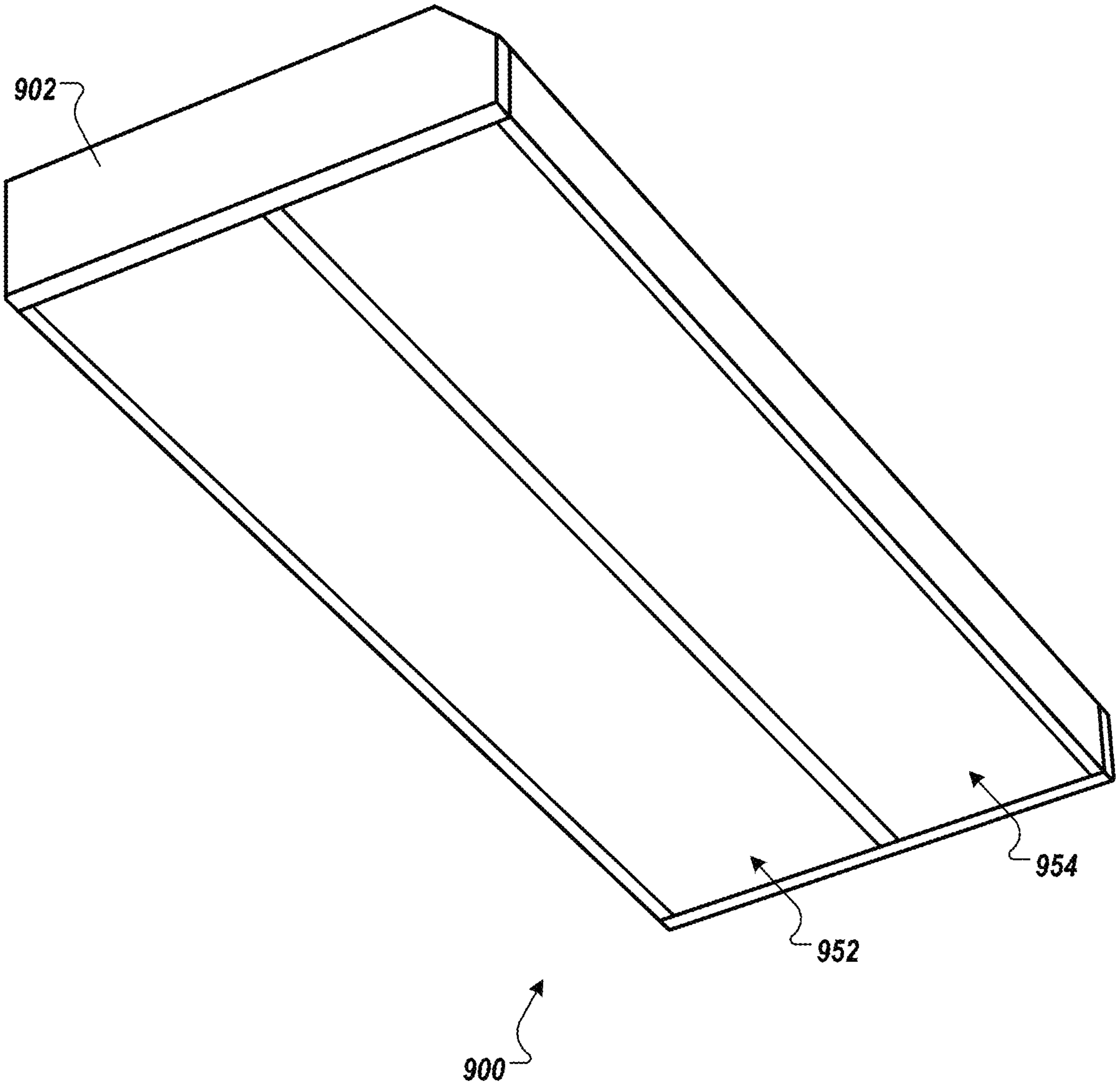
FIG. 9A is a perspective view of an exterior of an alternate example of an integrated lighting device.
Figure 9B:
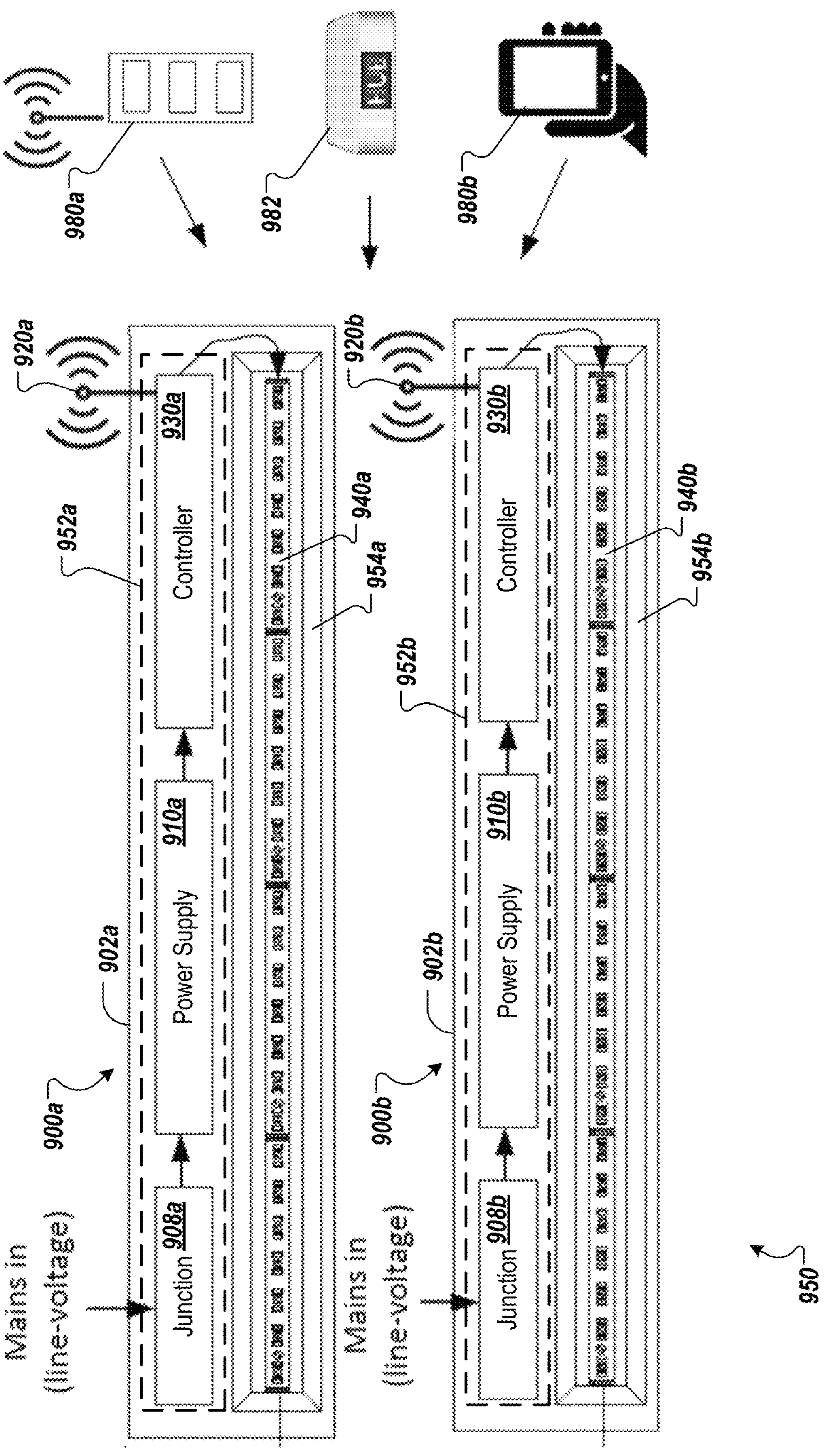
FIG. 9B and FIG. 9C are conceptual diagrams of example lighting systems that each include multiple integrated lighting devices.

In some implementations, a housing of an integrated lighting device can have a substantially cuboid exterior shape. For example, the housing 102 of the integrated lighting device 100 can be a rectangular cuboid, with its length dimension exceeding its height dimension and its depth dimension. In the present example, the housing 102 can be of an appropriate length (e.g., one meter, two meters, three meters, or another appropriate length), based on the space constraints and/or lighting needs of an area in which the integrating lighting device is to be installed. The housing 102, for example, can include a single housing element, or can include two or more housing elements that are joined at the ends (e.g., with a binding plate) to form a continuous unit of an increased length. The height and depth dimensions, for example, can be selected based at least in part on the components included in the interior of the housing 102, and on the configuration of the components. In the present example (e.g., a configuration in which power supply, antenna, controller, and wiring components are situated in a housing space above a lighting component), the height of the housing 102 can exceed its depth (e.g., with the height being approximately ten centimeters, and with the depth being approximately five centimeters). In some examples (e.g., an alternate configuration in which power supply, antenna, controller, and wiring components are situated in a housing space alongside a lighting component, as shown in FIGS. 9A-9B), the depth of the housing can exceed its height. In other examples, a housing's height and width can be substantially similar.

In general, a housing of an integrated lighting device can be fabricated from a material that is suitably light, sturdy, and damage-resistant. In the present example, the housing 102 can be extruded aluminum, with the surface of the aluminum being treated (e.g., anodized, lacquered, powder coated, air painted, etc.). In other examples, a housing can be fabricated from sheet metal (e.g., steel or another suitable metal), plastic (e.g., rigid fiberglass), wood, or another suitable material.

Installation of an integrated lighting device can be accomplished by a variety of different techniques. In some implementations, an integrated lighting device can be suspended from a surface (e.g., a ceiling, an undersurface of a cabinet, or another sort of surface). Referring to FIG. 1A, for example, the integrated lighting device 100 can be suspended from a ceiling 150 (e.g., along a truss) using multiple exterior suspension cables (e.g., a pair of exterior suspension cables 160*a*, 160*b*), with one end of each exterior suspension cable being removably attached to an upper face of the housing 102 (e.g., proximate to opposite ends of the housing 102), and with the other end of each cable being removably attached to a corresponding lighting support structure 162*a*, 162*b* (e.g., lighting rosettes) mounted to the ceiling 150. Attachment of the exterior suspension cables 160*a*, 160*b* to the housing 102 and to the corresponding lighting support structures 162*a*, 162, for example, can be accomplished using a suspension coupler, a suspension cable glider, or another suitable coupling mechanism. In the present example, each of the exterior suspension cables 162*a*, 162*b*, can be aircraft-grade galvanized steel suspension cables, however cables fabricated from other types of material (e.g., metal, plastic, textile, etc.) that provide sufficient tensile strength for support of the integrated lighting device 100 can also be used.

Although the present example depicts suspension of the integrated lighting device 100 from the ceiling 150, other installation techniques can be used in other examples. One possible technique includes the direct fastening of an integrated lighting device to a surface. For example, fastening hardware (e.g., screws, bolts, anchors, clips, etc.) can be used to removably couple the device 100 to the ceiling 150 (or another sort of surface). Another possible technique includes the recessing of an integrated lighting device can into a surface. For example, a portion of the ceiling 150 can be removed to match a profile of the device 100 (e.g., based on length and width dimensions of the device), with a space behind the ceiling 150 being sufficient to include the height of the device 100, such that a bottom of the device 100 (e.g., a portion that emits light) sits flush with the surface of the ceiling 150 when the device 100 is installed.

In general, at least one of the lighting support structures that are mounted to the ceiling 150 and from which the integrated lighting device 100 is suspended (e.g., lighting support structure 162*a*) can house a power fixture that is used to deliver electrical power to the device 100. The lighting support structure 162*a*, for example, can be positioned to cover a fixture box, and can include a cover plate that is configured to interface with a coupling mechanism of the exterior suspension cable 160*a*. Power from the fixture box can be delivered to the integrated lighting device 100 via a power cable 104, which in the present example can run along the exterior suspension cable 160*a* and can enter an end the housing 102 through a hole at an upper face of the housing 102.

The power cable 104, for example, can generally be a standard cable that is approved for line voltage power in a suspended lighting fixture. In the present example, the power cable 104 can be an 18-gauge SVT 3-conductor power cable that conforms to the Underwriters Laboratory (UL) standard, however other suitable types of power cables can be used. The length of the power cable 104 of the present example can be approximately six feet in length, however other suitable cable lengths can be used, based on installation factors for the integrated lighting device 100. The power cable 104, for example, can be coupled to the power supply 110 of the integrated lighting device 100.

In general, power delivered by a power fixture comes from a relatively high-voltage source (e.g., typically 120 volts or 240 volts of alternating current (AC) power in American electrical systems). However, the lighting components included in the integrated lighting device 100 of the present example are configured to operate using a relatively low-level of direct current (DC) power (e.g., approximately 80-120 watts at peak power consumption). Many lighting systems include external power converters to convert from a high-power AC source to a low-power DC output, which is then routed via power cables to various lighting devices that consume the low-power DC output. In contrast, the integrated lighting devices described in the present document each include their own power converters, which are selected and pre-installed based on the power consumption of the individual devices. Thus, installation of the integrated lighting devices can be streamlined, by eliminating the installation of external power converters and the additional wiring from the external power converters.

Referring now to FIG. 1B, for example, the power supply 110 can be configured to convert power from a high-voltage alternating current (AC) source into relatively low direct current (DC) power, for consumption by components of the integrated lighting device 100. In the present example, the power supply can be a line voltage-to-24V DC power supply, however power supplies having different specifications can be used in other examples, based on the power consumption specifications of components included in the device 100, and/or on available space within the upper portion of the housing 102. As shown in the present example, the power supply 110 can be positioned near an end of the integrated lighting device 100 at which the power cable 104 enters the housing 102 of the device 100. To facilitate servicing or replacement of the power supply 110, for example, the integrated lighting device 100 can include a removable endcap 170*a* at the end of the device 100 nearest to the power supply 110.

In the present example, the power supply 110 is electrically connected to the controller 130 by the conductor cable 112, which is configured to conduct power provided by the power supply 110 (e.g., 24 volt DC power, or another suitable amount of power) to the controller 130. The conductor cable 112 can be an 18 gauge 2-conductor cable, or another suitable type of cable. The conductor cable 112 in the present example runs along the length of the integrated lighting device 100, in a portion of the device that is within the housing 102 and above the lighting unit 140.

The antenna 120, for example, can be configured to receive wireless control signals that are transmitted from one or more remote control sources. In general, the remote control sources can include stationary computing devices (e.g., stationary device 180*a*, which can represent a personal computer, a server, or another sort of stationary computing device) and/or mobile computing devices (e.g., mobile device 180*b*, which can represent a smartphone, personal digital assistant, tablet, laptop, or another sort of mobile computing device) that executes a lighting control application that can cause the computing devices to wirelessly transmit commands for controlling various lighting effects of the integrated lighting device 100, such as turning a light source on or off, changing an intensity and/or color of emitted light, and so forth. The lighting control commands, for example, can be provided by the lighting control application in response to input from an application user, in response to sensor data received via a wired or wireless connection from one or more lighting system sensors (e.g., sensor 190, which can represent a motion sensor, lighting level sensor, lighting color sensor etc.), and/or according to a predetermined schedule. For example, the lighting control application can reference a predetermined schedule (e.g., stored in a database) that includes a target level and temperature of lighting for a plurality of times during the day. Based on input from the sensor 190, for example, the lighting control application can generate lighting control commands to compensate for a current level and temperature of lighting in a space (e.g., including lighting from other sources, such as natural lighting that enters the space from a window), and can provide the lighting control commands to the integrated lighting device 100 (or an array of integrated lighting devices). For example, the target level and temperature of lighting in the morning can be relatively bright and cool, whereas the target level and temperature in the evening can be relatively dim and warm, to conform to the body's natural circadian cycle.

In some implementations, at least a portion of an antenna can be positioned external to a housing of an integrated lighting device. In the present example, the antenna 120 is depicted as being primarily outside of the housing 102 of the integrated lighting device 100, on top of an upper face of the housing 102, roughly equidistant from both ends of the housing 102. As another example, a portion of the antenna 120 (e.g., an antenna wire) can be positioned outside of the housing 102, and other components of the antenna 120 can be located within the housing 102 (e.g., in a portion of the housing 102 that is above the lighting unit 140).

In some implementations, an antenna can be positioned completely within a housing of an integrated lighting device. For example, the housing 102 of the integrated lighting device 100 can be fabricated from a material (e.g., a type of plastic) through which wireless signals can be transmitted, and the antenna 120 can be located within the housing 102 (e.g., in a portion of the housing 102 that is above the lighting unit 140). As another example, the housing 102 of the integrated lighting device 100 can be fabricated from a material (e.g., a type of metal) through which wireless signals cannot be readily transmitted, and can include one or more holes (e.g., in proximity to the antenna 120) through which wireless signals can be transmitted. As another example, a main portion of the housing 102 of the integrated lighting device 100 can be fabricated from a material through which wireless signals cannot be readily transmitted, and the housing 102 can include one or more panel sections (e.g., in proximity to the antenna 120) of a material through which wireless signals can be transmitted. As another example, a main portion of the housing 102 of the integrated lighting device 100 can be fabricated from a material through which wireless signals cannot be readily transmitted, and the endcaps 170*a*, 170*b* can be fabricated from a radio frequency (RF) transparent material through which wireless signals can be transmitted (e.g., with at least a portion of the antenna 120 being positioned near one or both of the endcaps).

In general, a short-range wireless technology (e.g., WiFi, Bluetooth, Bluetooth LE, Zigbee, or another suitable short-range wireless technology) can be used to transmit control commands for reception by the antenna 120 (and optionally, to transmit data through the antenna 120 for reception by an external device). In the present example, the antenna 120 can be tuned to the 2.4 GHz radio spectrum, however other examples can use different communication frequencies. In some implementations, multiple communication technologies and/or protocols can be used by the integrated lighting device 100. For example, general operation of the device 100 can occur over a general operation communication protocol (e.g., a Zigbee protocol, or another suitable protocol), and configuration of the device 100 (e.g., adjusting internal settings, updating firmware, running test commands, or performing another sort of configuration operation) can occur over a configuration communication protocol (e.g., a Bluetooth protocol, or another suitable protocol). For example, the general operation communication protocol and the configuration communication protocol can be used by separate radios included in the device 100, with the general operation communication protocol being used by general operators of the device 100, and with the configuration communication protocol being used by installers and/or maintenance personnel. Communication signals received by the antenna 120, for example, can be electrically transmitted through the antenna cable 122, which is also connected to the controller 130. The antenna cable 122, for example, can be a coaxial antenna cable, or another suitable type of antenna cable for relaying communication signals.

The controller 130, for example, can receive (and optionally transmit) communication signals from/to the antenna 120 (e.g., via the antenna cable 122), and can receive power from the power supply 110 (e.g., via the conductor cable 112). In general, the controller 130 can include various computing components (e.g., processors, memory) that are configured to receive wireless control signals from a remote control source (and to optionally transmit communication signals), to translate the wireless control signals into control commands that are received by and acted upon by the lighting unit 140, and to provide a regulated amount of power to the lighting unit 140 for generating light. In the present example, the controller 130 can be a radio-frequency five-channel dimmer/controller, however other examples can use different controllers, based on the specifications of the lighting unit 140, and/or on available space within the upper portion of the housing 102. As shown in the present example, the controller 130 can be positioned near an end of the integrated lighting device 100 that is an opposite end from the power supply 110. To facilitate servicing or replacement of the controller 130, for example, the integrated lighting device 100 can include a removable endcap 170*b* at the end of the device 100 nearest to the controller 130.

To provide wireless communication capabilities, for example, the controller 130 can include one or more wireless radios, and can use a selected short-range wireless technology (e.g., WiFi, Bluetooth, Bluetooth LE, Zigbee, or another short-range wireless technology) to facilitate communication with a remote control source. In the present example, the controller 130 can include dual radios, and can operate either using a Bluetooth protocol or an IEEE 802.15.4 Zigbee protocol. Other communication protocols can be used in other examples, such as a mesh protocol (e.g., supported by Bluetooth LE), which can facilitate a one-to-many communication scheme.

To provide control commands to the lighting unit 140, for example, the controller 130 can support one or more channels of control for the lighting unit 140 (e.g., a light emitting diode (LED) unit). The controller 130 can electronically transmit lighting commands to the lighting unit 140 via the lighting unit cable 132, which can include a separate conductor cable for transmitting lighting commands to each diode channel in the lighting unit 140, and a separate conductor cable for transmitting power to the lighting unit 140. In a basic case, for example, the controller 130 can support a single channel of lighting control (e.g., white, or a single color). In an advanced case, for example, the controller 130 can support multiple channels of lighting control (e.g., two or more channels), with each channel being dedicated to a different color (e.g., as implemented by a set of diodes). The controller 130 of the present example can support five channels of LED control, including separate channels for red, green, blue, warm white, and cool white LEDs. As another example, the controller 130 can support six channels of LED control, including separate channels for red, green, blue, warm white, neutral white, and cool white LEDs. As another example, the controller 130 can include a three channel mode that is used to support a tunable white feature, in which a first channel is dedicated to a warm white LED, a second channel is dedicated to a neutral white LED, and a third channel is dedicated to a cool white LED. Lighting control (e.g., LED control) can generally be supported by the controller 130 using a variable frequency pulse-width modulation technique for dimming, supporting dimming levels between 0.1% and 100%.

The lighting unit 140, for example, can receive lighting commands and power from the controller via the lighting unit cable 132, and can generate light based on the received lighting commands and using the received power. In general, the lighting unit 140 can be positioned within the housing 102 of the integrated lighting device 100, beneath the various electrical components of the device 100 (e.g., the power supply 110, antenna 120, controller 130, and various cables), and can be a flat strip that traverses the length of the housing 102. The lighting unit 140 in the present example can be a light-emitting diode (LED) strip, which includes a series of LEDs mounted on a flexible or rigid printed circuit board (PCB). For example, the lighting unit 140 can be mounted to a light tray structure within the housing 102 (shown in further detail in FIGS. 2A-2C). Light generated by the lighting unit 140 can be emitted from an underside of the integrated lighting device 100 (e.g., through a diffuser, also shown in further detail in FIGS. 2A-2C).

Figure 1C:
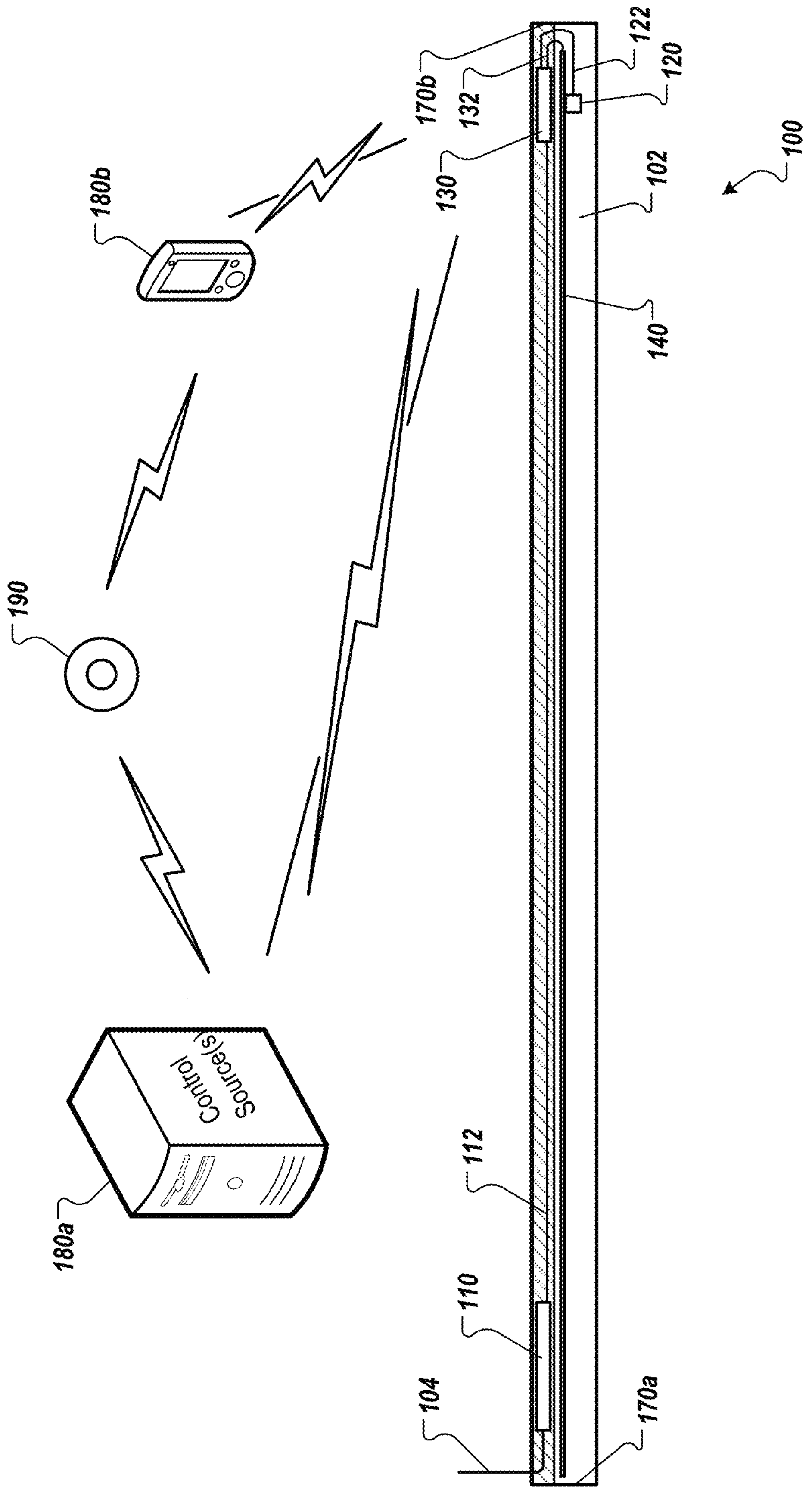
FIG. 1C is a sectional side view of an example integrated lighting device, in an alternate configuration.

Referring now to FIG. 1C, a sectional side view of the example integrated lighting device 100 is shown in an alternate configuration. The example integrated lighting device 100 shown in the alternate configuration of FIG. 1C is substantially similar to the device 100 shown in the configuration of FIGS. 1A-1B with respect to included components, connections between the components, and functionality. However, in contrast to the configuration of FIGS. 1A-1B (which shows the antenna 120 as being located primarily outside of the housing 120 of the integrated lighting device 100), in the configuration of FIG. 1C, the antenna 120 is shown as being located entirely within the housing 120 (which is also described as a possible implementation with respect to FIGS. 1A-1B). In the present example, the antenna 120 is positioned in a portion of the housing 120 that is beneath the lighting unit 140, in a space that is located between the lighting unit 140 and a diffuser (described in further detail with respect to FIGS. 2A-2C) through which light generated by the lighting unit 140 can be emitted. As described with respect to FIGS. 2A-2C, for example, the diffuser can be fabricated from a translucent and radio frequency (RF) transparent material (e.g., plastic, glass, etc.), through which wireless signals can be transmitted. By positioning the antenna 120 between the lighting unit 140 and the diffuser, for example, the aesthetics of the integrated lighting device 100 can be streamlined, and an amount of machining to be performed on the housing 102 can be reduced (e.g., machining for embedding the antenna 120 at an exterior of the housing 102, machining for fabricating holes and/or panel section areas in the housing 102 for providing RF access for an interior antenna 120, etc.).

Figure 2A:
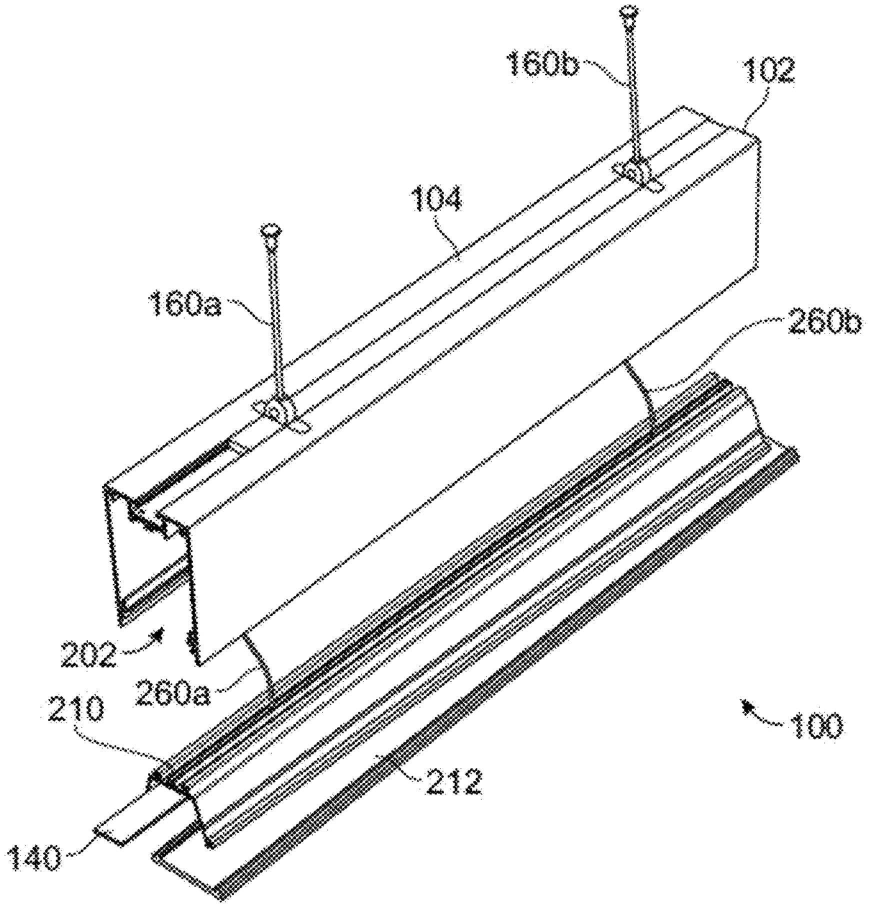
FIG. 2A is an exploded perspective view of an assembly of an example integrated lighting device.

Referring now to FIG. 2A, an exploded perspective view is shown of an assembly of the example integrated lighting device 100. As shown in the present example, the housing 102 of the integrated lighting device 100 can be supported by the pair of exterior suspension cables 160*a*, 160*b*. As shown in the present example, the housing 102 forms a roughly c-shaped channel 202, with an open portion of the channel 202 facing downwards when the integrated lighting device 110 is installed. The integrated lighting device 100 of the present example also includes a light tray structure 210, which runs the length of the housing 102, and is configured to be removably affixed within the c-shaped channel 202 of the housing 102. In the present example, the light tray structure 210 can be fabricated from extruded aluminum, with the surface of the aluminum being treated (e.g., anodized, lacquered, powder coated, air painted, etc.). In other examples, a light tray structure can be fabricated from sheet metal (e.g., steel or another suitable metal), plastic (e.g., rigid fiberglass), wood, or another suitable material.

In the present example, the integrated lighting device 100 includes a pair of interior suspension cables 260*a*, 260*b* (e.g., aircraft-grade galvanized steel cables, or cables of another material having sufficient tensile strength for support of the light tray structure 210), each cable being affixed at one end to an upper interior face of the housing 102, and being affixed at the other end to an upper portion of the light tray structure 210. The interior suspension cables 260*a*, 260*b*, for example, can each be a uniform length (e.g., several feet) that is sufficient for the light tray structure 210 to securely extend beyond the bottom of the housing 102 (e.g., to extend without falling to the floor) when the light tray structure 210 is decoupled from the housing 102. In general, decoupling of the light tray structure 210 from the housing 102 can be performed in order to service or replace components (e.g., including the power supply 110, the antenna 120, the controller, and/or various cables, shown in FIG. 1B) of the integrated lighting device 100. As another example, the housing 102 can include endcaps (not shown in the present figure) at each end of the housing 102, which can be removed to facilitate servicing or replacement of the components. As shown in FIG. 1B, for example, the power supply 110 can be positioned near one end of the integrated lighting device 100, and the controller 130 can be positioned near the other end of the device 100, thus facilitating component servicing/replacement without decoupling the light tray structure 210 from the housing 102.

Figure 2B:
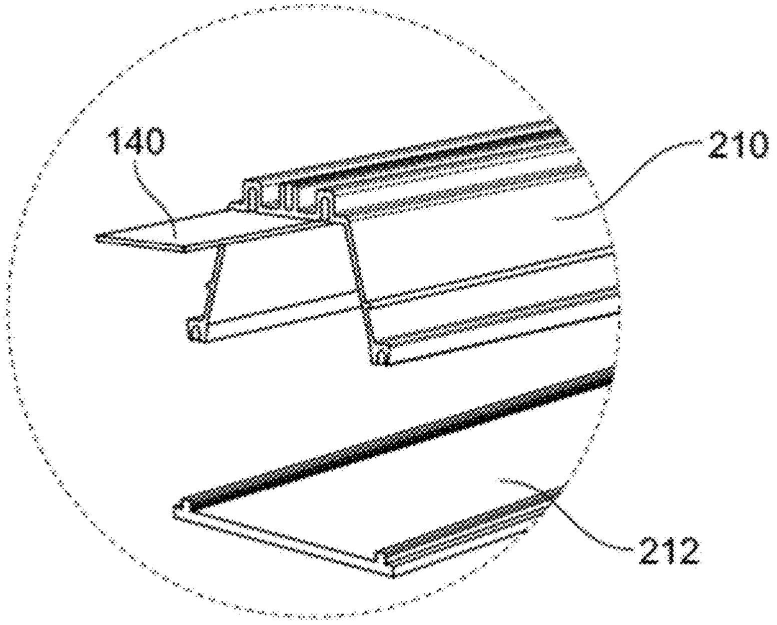
FIG. 2B is a detail perspective view of a portion an assembly of an example integrated lighting device.

Referring now to FIG. 2B, a detail perspective view is shown of a portion of the assembly of the example integrated lighting device 100. As shown in the present example, the light tray structure 210 forms a roughly c-shaped channel, with an open portion of the channel facing downwards when installed. Components (e.g., including the power supply 110, the antenna 120, the controller 130, and/or various cables, shown in FIG. 1B) of the integrated lighting device 100 can be placed in an interior component space that is formed between an upper portion of the light tray structure 210 and an upper interior portion of the housing 102, when the light tray structure 210 is coupled to the housing 102.

In some implementations, at least some of the components can be removably affixed to an interior upper portion of the housing 102 or can be removably affixed to the top of the light tray structure 210. For example, the power supply 110 can be removably affixed using low-tack silicone adhesive pads. The low-tack silicone adhesive pads, for example, can provide enough adhesion for the power supply 110 to remain in place when the integrated lighting device 110 is handled, but will release with a small amount of effort, thus enabling free movement and removal of the power supply 110 for possible replacement.

In some implementations, at least some of the components can be freely placed within the interior component space that is formed between an upper portion of the light tray structure 210 and an upper interior portion of the housing 102. For example, the controller 130 can be placed within the interior component space and allowed to float freely. The controller 130, for example, may generally be sufficiently lightweight such that the wiring connections of the controller 130 within the housing 102 can support the controller 130 when the integrated lighting device 110 is handled. As another example, a press-fit mounting tray can be provided within the interior component space to secure the controller 130, which can be slid out of the housing 102 after removing an end cap nearest to the controller 130.

In the present example, the lighting unit 140 (e.g., a light emitting diode (LED) strip) can be affixed to an upper portion of the light tray structure 210, within the c-shaped channel of the light tray structure 210. A diffuser 212 (e.g., fabricated from translucent plastic (e.g., polycarbonate or another suitable translucent plastic), translucent glass, or another suitable translucent material that is also radio frequency (RF) transparent such that wireless signals can pass through the diffuser) can be removably affixed to the open portion of the c-shaped channel of the structure 210, for example, such that the lighting unit 140 is not directly exposed to the environment. Attachment of a lighting unit within an integrated lighting device can be accomplished using a variety of different mechanisms.

In some implementations, an adhesive can be used to affix a lighting unit to a light tray structure. For example, the lighting unit 140 can be a flexible printed circuit board (PCB) having a length that extends along the length of the light tray structure 210, and a high-grade adhesive can be used to permanently affix the back of the flexible PCB to the light tray structure 210. Affixing the flexible PCB to the light tray structure 210, for example, can include initially applying a chemical primer on the light tray structure 210 (e.g., a liquid adhesion promoter that is engineered for use in conjunction with double-sided tape), and applying double-sided tape to a back side of the lighting unit 140. Application of the chemical primer to the light tray structure 210, for example, can increase surface contact between the structure 210 and the back side of the lighting unit 140 (e.g., especially when the surface of the structure 210 is dimpled due to an uneven application of paint), and can ensure that preparation of the surfaces is such that the structure 210 and the lighting unit 140 are bound across a variety of temperature conditions (e.g., when the temperature of the lighting unit 140 increases during use). Further, affixing the lighting unit 140 to the light tray structure 210 can include use of a rubber wheel to apply even pressure along the length of the lighting unit 140 when the lighting unit 140 is being adhered to the structure 210, thereby ensuring even surface contact and decreasing the likelihood of subsequent delamination.

In some implementations, mechanical fasteners can be used to affix a lighting unit to a light tray structure. For example, the lighting unit 140 can be a rigid printed circuit board (PCB) (e.g., with base material of fiberglass or another suitable rigid material) having a length that extends along the length of the light tray structure 210, or can include a series of smaller rigid PCBs (e.g., each being one foot in length, or another suitable length) that are interconnected and electronically coupled along the length of the light tray structure 210. Affixing the rigid PCB(s) to the light tray structure 210, for example, can include mechanically coupling the rigid PCB(s) to the light tray structure 210 (e.g., using fastening hardware such as screws, bolts, anchors, clips, or other suitable types of mechanical fasteners). In general, use of rigid PCBs can increase heat dissipation, allowing for higher lumen output while potentially reducing fixture assembly time. Further, use of rigid PCBs can potentially allow for in-field serviceability, should a failure occur in any of the PCBs.

Figure 3:
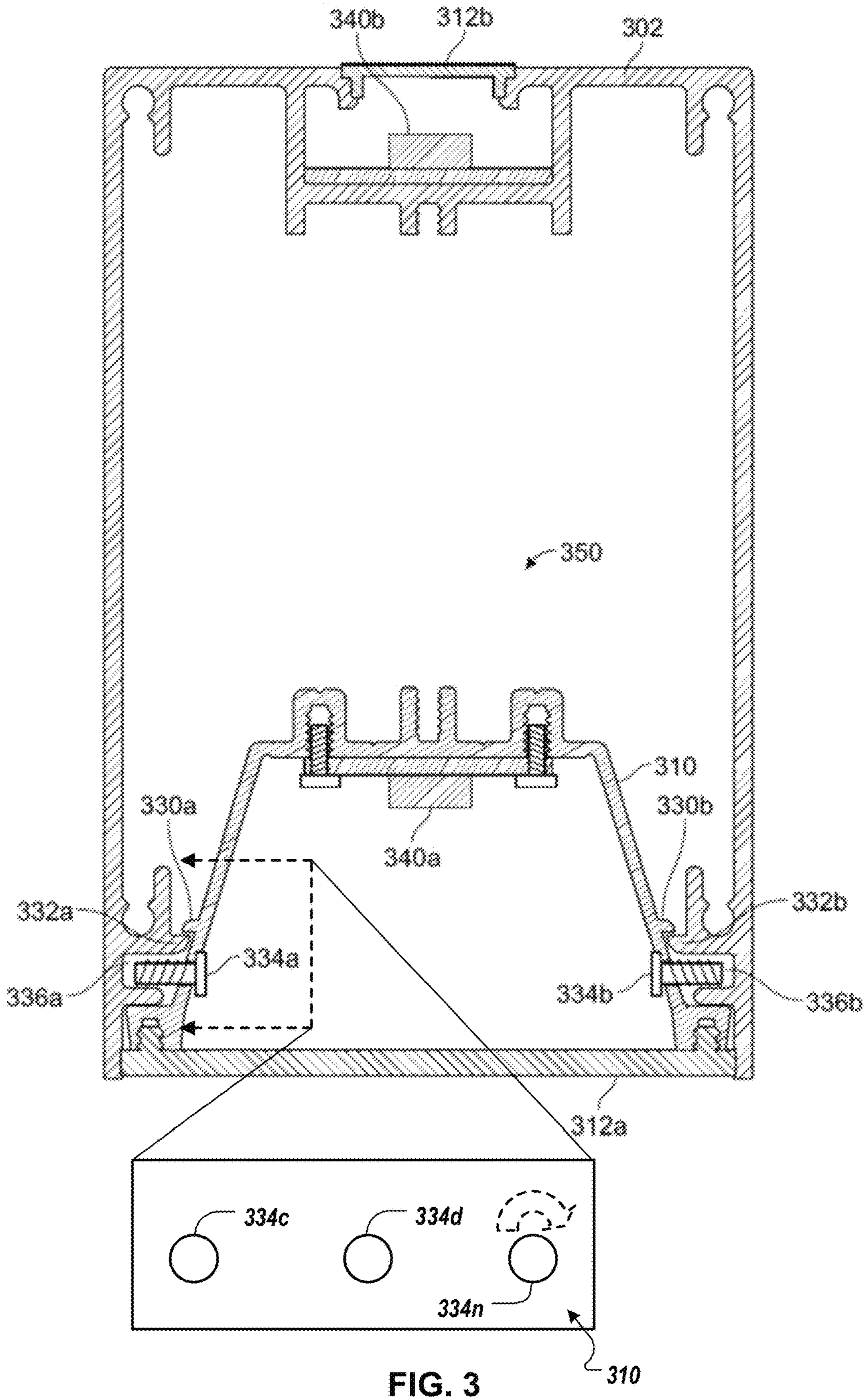
FIG. 3 is a sectional profile view of a housing of an example integrated lighting device.

Referring now to FIG. 3, a sectional profile view is shown of a housing of an integrated lighting device. Housing 302 (e.g., functionally similar to the housing 102 shown in previous figures), for example, can include an interior component compartment 350 that is formed between a light tray structure 310 (e.g., functionally similar to the light tray structure 210 shown in previous figures) when the light tray structure 310 is installed within a c-shaped channel formed by the housing 302. The interior component compartment 350, for example, can include various components (e.g., power supply, antenna, controller, various cables, etc.) of the integrated lighting device. In the present example, the housing 302 can include multiple lighting units (as opposed to a single lighting unit as shown in previous figures), including a downward-facing lighting unit 340*a* (e.g., similar to the lighting unit 140 shown in previous figures), and an upward-facing lighting unit 340*b*. The downward-facing lighting unit 340*a*, for example, can be protected by a diffuser 312*a* (e.g., similar to the diffuser 212 shown in previous figures), and the upward-facing lighting unit 340*b* can be covered by a diffuser 312*b*. Each of the diffusers 312*a*, 312*b*, for example, can be translucent covers that can removably coupled (e.g., via a snap fit, and/or via fastening hardware), with the diffuser 312*a* being removably coupled to the light tray structure 310, and with the diffuser 312*b* being removably coupled to the housing 302. In general, attachment of a light tray structure within a housing of an integrated lighting device can be accomplished using a variety of different mechanisms.

In some implementations, a tension fit can be used to attach a light tray structure within a housing of an integrated lighting device. For example, the housing 302 can be of a semi-flexible material, such that the opening of the c-shaped channel formed by the housing 302 can be physically widened under pressure (e.g., when installing the light tray structure 310 in the housing 302, and when removing the light tray structure 310 from the housing 302). Once installed, for example, the pressure applied to the housing 302 can be released, thereby returning the housing 302 to its original form, and causing placement tabs 330*a*, 332*b* of the light tray structure 310 to physically engage with corresponding placement grooves 332*a*, 332*b* of the housing 302. As another example, the housing 302 and the light tray structure 310 can include snap fit mechanisms that do not involve external fastening hardware. Tension fit installation techniques, for example, can generally be used when the integrated lighting device is fully accessible to an installer (e.g., when the device is suspended from or attached to a surface).

In some implementations, fastening hardware (e.g., screws, bolts, anchors, clips, etc.) can be used to attach a light tray structure within a housing of an integrated lighting device. For example, the housing 302 can be of a rigid material and/or may not be fully accessible to an installer (e.g., when the device is recessed into a surface). In the present example, the housing 302 can include a series of threaded channels (e.g., including the treaded channels 336*a*, 336*b*), along the length of the housing 302 at intervals (e.g., every foot, every two feet, every three feet, or another suitable interval) The threaded channels, for example, can be configured to accept a series of fastening hardware components (e.g., including screws 334*a*, 334*b*) that can be applied to mechanically couple the light tray structure 310 to the housing 302. As another example, the housing 302 and/or the light tray structure 310 can include a series of locking cams (e.g., including cams 334*c*, 334*d*, 334*n*) that, when rotated (e.g., a partial turn), can permit the light tray structure 310 to be installed in or removed from the housing 302, thus facilitating a simplified servicing of components (e.g., the power supply 110 and/or the controller 130) if any of the components were to fail. The series of locking cams 334*c*, 334*d*, 334*n*, for example, can be integral to the light tray structure 310, with the locking cams being distributed along the length of the light tray structure 310 at regular intervals.

Figure 4:
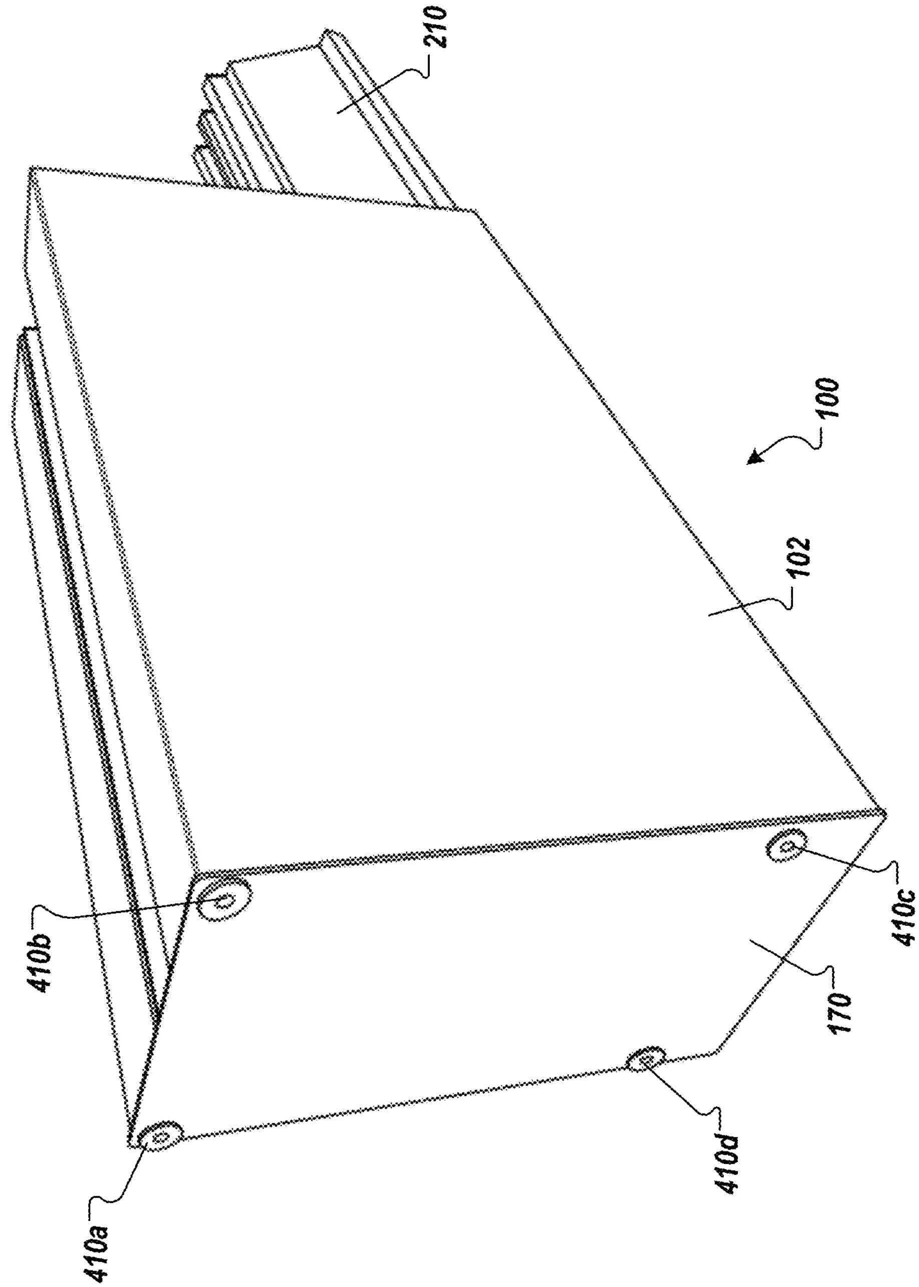
FIG. 4 is a perspective cutaway end view of an exterior of an example integrated lighting device.

Referring now to FIG. 4, a perspective cutaway end view of an exterior of the example integrated lighting device 100 is shown. As shown in the present example, the integrated lighting device 100 is oriented similarly as in the depiction of the device 100 shown in FIG. 2A, with the light tray structure 210 being located in a lower portion of the housing 102 and facing downwards, such that generated light is projected downwards from the device 100. The light tray structure 210, for example, can slide along placement grooves (e.g., similar to placement grooves 332*a*, 332*b* of the housing 302 shown in FIG. 3) that run along interior sides of the housing 102 (not shown in the present figure), and that secure the light tray structure 210 through a tension fit, a snap fit mechanism, and/or fastening hardware.

In the present example, a removable endcap 170 of the integrated lighting device 100 is positioned such that the endcap 170 covers an end of the housing 102. The removable endcap 170 can be structurally and functionally similar to either of the removable endcaps 170*a* and 170*b* shown in FIG. 1B and FIG. 1C, for example. The removable endcap 170 can be fabricated from a same material as that of the housing 102 (e.g., metal, plastic, wood, etc.), or can be fabricated from a material that is different from that of the housing. The removable endcap 170 of the present example substantially matches the profile of the housing 102 (e.g., a rectangle that is approximately 2.5 inches in width and 4 inches in height, or another suitable set of dimensions). When attached, the removable endcap 170 of the present example completely covers an interior component compartment that is formed between the light tray structure 210 and an interior top of the housing (e.g., similar to the interior component compartment 350, shown in FIG. 3) and a lighting component compartment that is formed between the light tray structure 210 and a downward-facing diffuser (e.g., similar to a compartment that is formed between the light tray structure 310 and the diffuser 312*a*, also shown in FIG. 3).

Attachment of the removable endcap 170 can be accomplished through a variety of mechanisms that provide removable coupling of the removable endcap 170 and the housing 102. In the present example, the removable endcap 170 is attached to the housing 102 by fastening hardware 410*a-d* (e.g., screws, pins, latches, or other sorts of fastening hardware) positioned near the corners of the endcap 170. Alternately, another sort of fastening mechanism can be used, such as Velcro, magnets, etc., and/or a snap fit mechanism between the removable endcap 170 and the housing 102. When the removable endcap 170 is removed from the housing 102, for example, the interior component compartment and the lighting component compartment can be exposed to facilitate servicing of device components (e.g., the power supply 110, the antenna 120, the controller 130, the lighting unit 140, etc.) within the interior of the housing.

Figure 5:
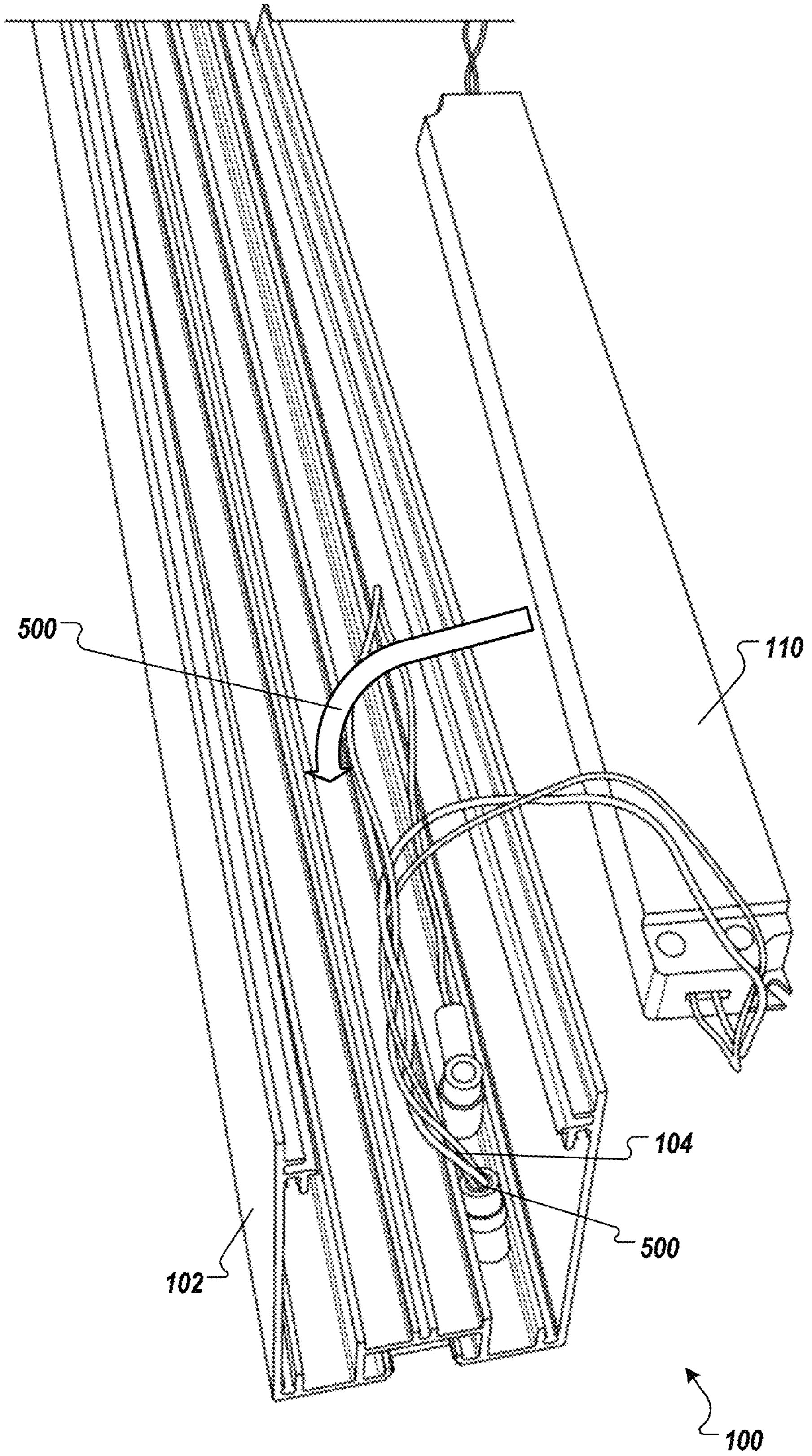
FIG. 5 is a perspective view of an interior of an example integrated lighting device, including a depiction of component installation within the interior.

Referring now to FIG. 5, a perspective view of an interior of the example integrated lighting device 100 is shown, including a depiction of component installation within the interior. The integrated lighting device 100 shown in the present example is oriented differently from the depiction of the device 100 shown in FIG. 2A, with the device 100 being shown in FIG. 5 from an underneath perspective, with an open portion of the c-shaped channel of the housing 102 (e.g., similar to the c-shaped channel 202, shown in FIG. 2A) being shown here as facing upwards rather than downwards. Further, the integrated lighting device 100 is shown in the present example without an addition of the light tray structure 210. Such an orientation and state of the integrated lighting device 100 may occur during assembly, for example, during which the housing 102 of the device 100 is placed on a working surface with its c-shaped channel facing upwards, and during which components are progressively placed within the c-shaped channel and are connected to each other. In the present example, the power cable 104 (e.g., shown here as being a 120 volt cable and having an electrical ground connection) can be passed through a hole 500 that extends from an upper face of the housing 102 to an interior of the housing 102, and can be connected to the power supply 110. As indicated by arrow 500, for example, the power supply 110 can be placed within the c-shaped channel of the housing 102, and can optionally be secured within the housing 102. Other components of the integrated lighting device 100 that are to be placed within an interior component compartment of the housing 102 (e.g., the controller 130, and optionally, the antenna 120) can also be connected to each other (e.g., through wired connections) and can optionally be secured to the housing 102.

Figure 6:
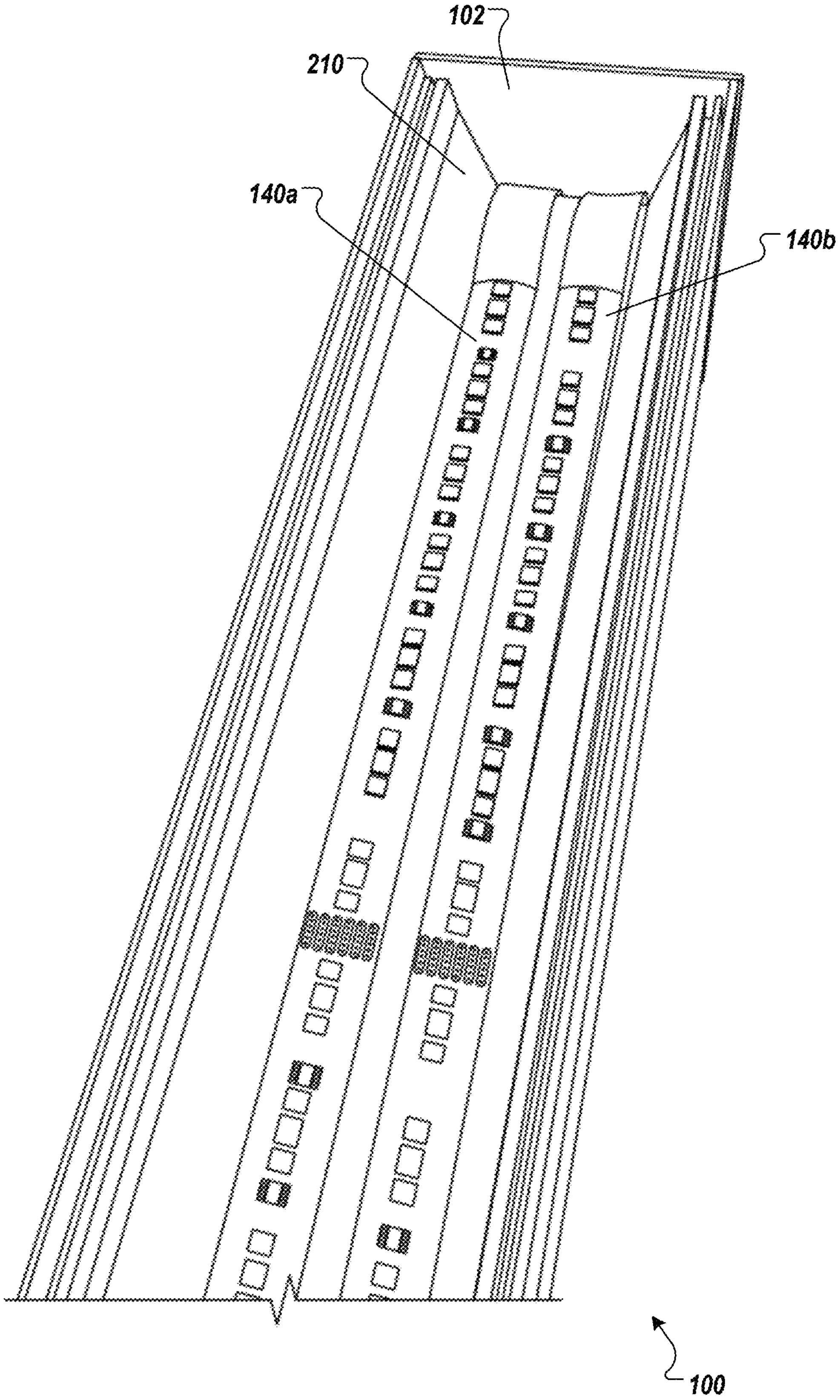
FIG. 6 is a perspective view of an interior of an example integrated lighting device, including an installation of a light tray structure and a lighting unit.

Referring now to FIG. 6, a perspective view of an interior of the example integrated lighting device 100 is shown, including an installation of the light tray structure 210 and the lighting unit 140. Continuing the installation example of FIG. 5, once components have been installed in the interior component compartment of the housing 102 (or have optionally been affixed to an upper face of the light tray structure 210), the light tray structure 210 can be secured within the c-shaped channel of the housing 102 (e.g., through a tension fit, by using fastening hardware, or another suitable securing mechanism). As shown in the present example, the light-tray structure 210 can form its own c-shaped channel, which faces in a same direction as the c-shaped channel of the housing 102 when the light-tray structure 210 is nestled within the housing 102. In the present example, the lighting unit 140 includes a pair of lighting units 140*a* and 140*b* (e.g., light-emitting diode (LED) strips or other sorts of lighting units), which can each be installed at an interior face within the c-shaped channel of the light tray structure 210, parallel to each other and along the length of the light-tray structure 210. Installation of the pair of lighting units 140*a* and 140*b*, for example, can be accomplished using any of the various techniques described elsewhere in this document. The lighting units 140*a*, 140*b* of the present example can each wrap around an end of the light tray structure 210, and can be connected to the controller 130 (e.g., by corresponding lighting unit cables). Once component installation is complete, for example, the diffuser 212 (shown in FIG. 2B) can coupled (e.g., via a snap fit, and/or via fastening hardware) to the light tray structure 210, such that the lighting units 140*a*, 140*b*, are not directly exposed to the environment.

Figure 7:
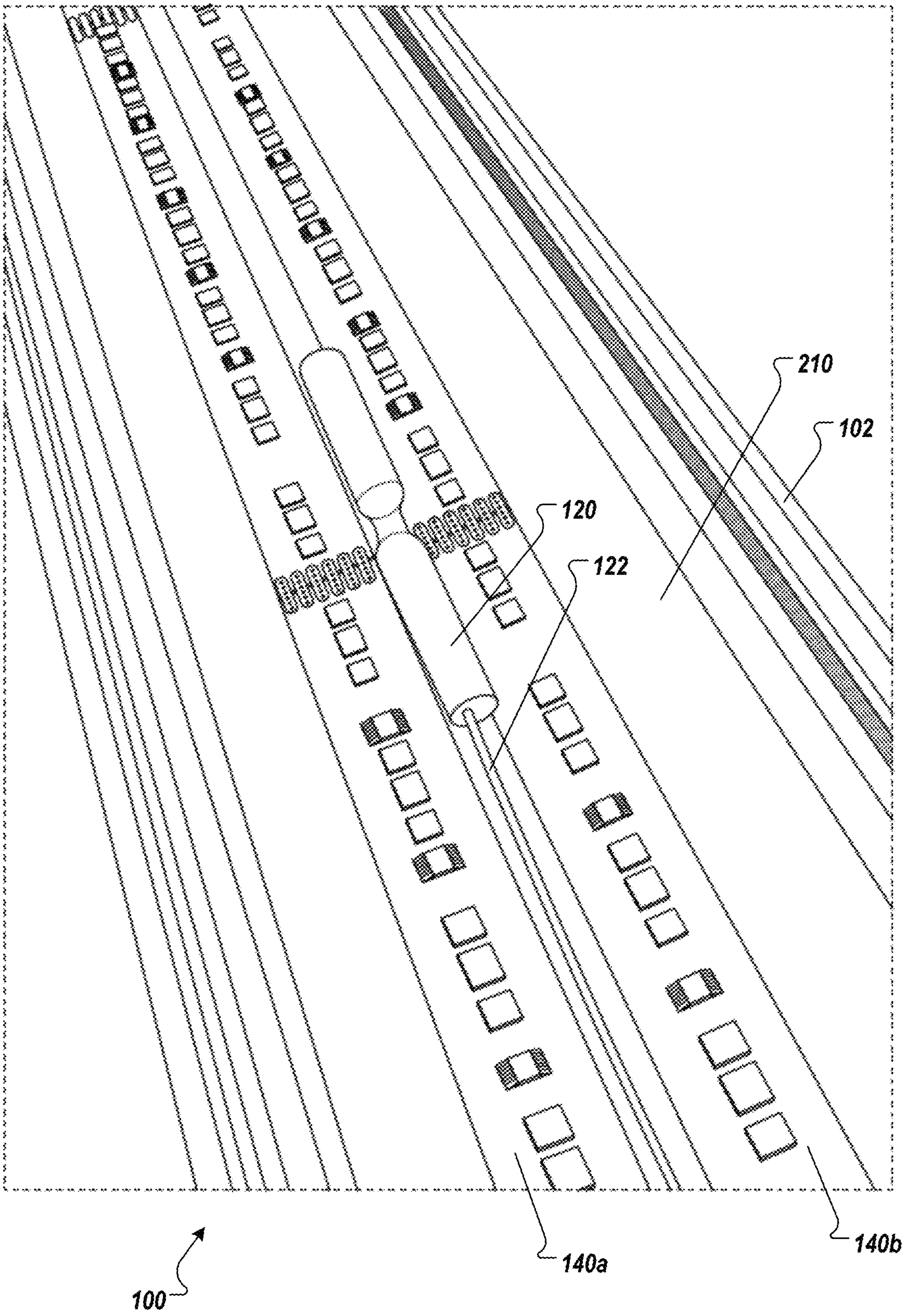
FIG. 7 and FIG. 8 are perspective views of an interior of an example integrated lighting device, including alternate installations of an antenna within a light tray structure and beneath a lighting unit.
Figure 8:
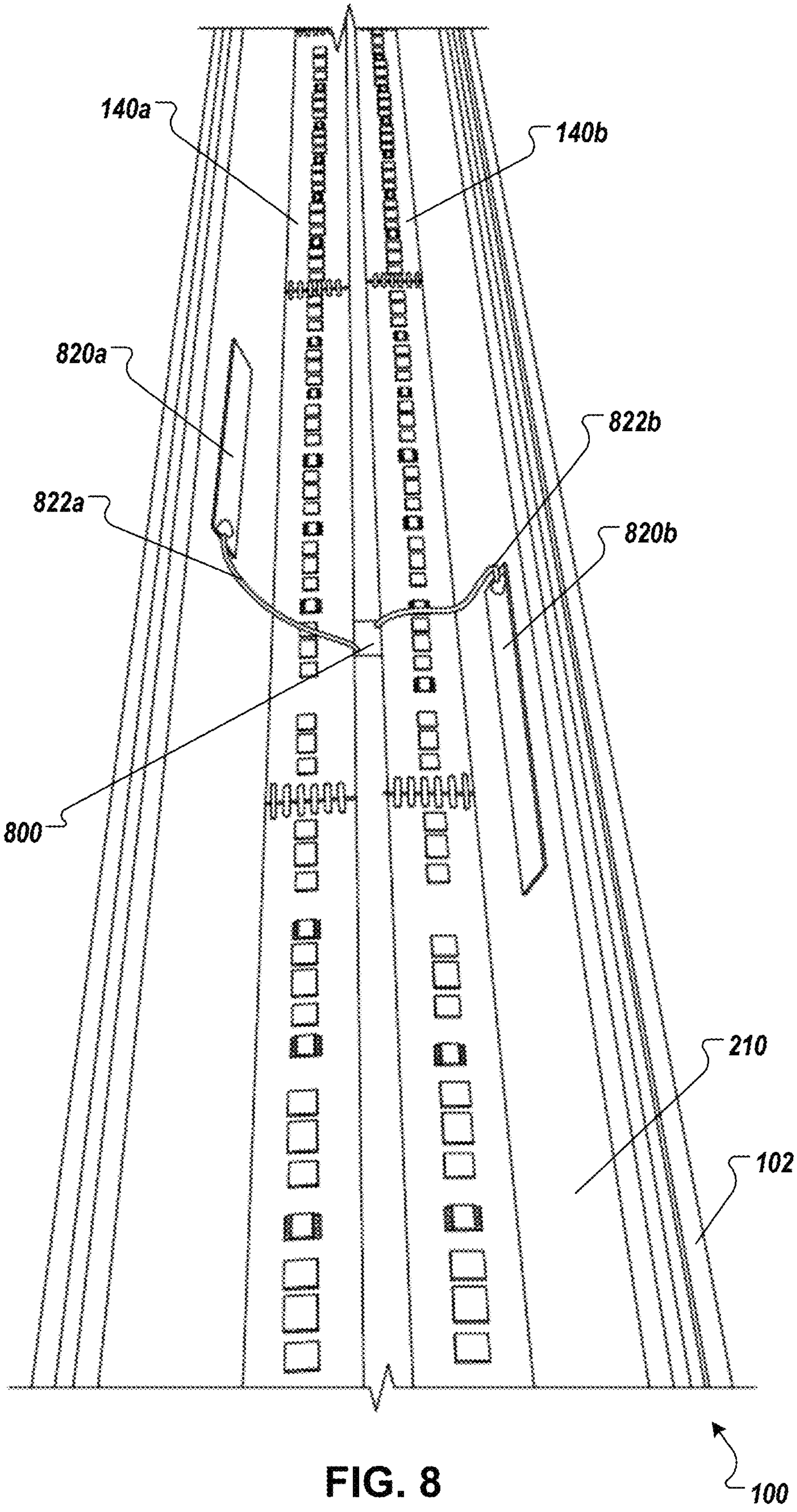

Referring now to FIG. 7 and FIG. 8, perspective views of an interior of the example integrated lighting device 100 are shown, including alternate installations of the antenna 120 within the light tray structure 210 and beneath the lighting unit 140. The orientation of the integrated lighting device 100 shown in FIG. 7 and FIG. 8 is similar to that of the device 100 shown in FIG. 5 and FIG. 6, in that the device 100 is shown from an underneath perspective. As shown in each of FIG. 7 and FIG. 8, for example, the housing 102 of the device 100 is positioned such that its c-shaped channel is facing upwards, with the light-tray structure 210 being nestled within the housing 102 and with the c-shaped channel of the light-tray structure 210 also facing upwards. Similar to the integrated lighting device 100 shown in FIG. 6, for example, the device 100 shown in each of FIGS. 7 and 8 includes a pair of lighting units 140*a*, 140*b*, installed at an interior face within the c-shaped channel of the light tray structure 210, parallel to each other and along the length of the light-tray structure 210.

Referring specifically to FIG. 7, an antenna installation is shown in which a single antenna (e.g., antenna 120) is placed within a lighting component compartment that exists between the light-tray structure 210 and the diffuser 212 (e.g., shown in FIG. 2B) when the integrated lighting device 100 is assembled. In the present example, the antenna 120 can be affixed (e.g., using an adhesive and/or mechanical mechanism) between the pair of lighting units 140*a*, 140*b*, such that lighting elements of the lighting units 140*a*, 140*b* are not obstructed by the antenna 120. As shown in the present example, the antenna cable 122 can be connected to the antenna 120, and can run parallel to and between the pair of lighting units 140*a*, 140*b*. The antenna cable 122, for example, can wrap around the end of the light-tray structure 210 (or can exit a hole in the light tray structure), and can be connected to the controller 130 that is placed in a component compartment that exists in a space between the light-tray structure 210 and the upper interior surface of the housing 102 (e.g., as shown in FIG. 1C).

Referring specifically to FIG. 8, an antenna installation is shown in which a pair of antennas (e.g., antennas 820*a* and 820*b*, functionally similar to the antenna 120) are placed within a lighting component compartment that exists between the light-tray structure 210 and the diffuser 212 (e.g., shown in FIG. 2B) when the integrated lighting device 100 is assembled. In the present example, the pair of antennas 820*a* and 820*b* can be flat-panel antennas that are respectively affixed (e.g., using an adhesive and/or mechanical mechanism) to opposite side wall portions of the light tray structure 210, such that lighting elements of the lighting units 140*a*, 140*b* are not obstructed by either of the antennas 820*a*, 820*b*. As shown in the present example, each of the antennas 820*a*, 820*b* can be connected to a respective antenna cable 822*a*, 822*b*, which can in turn exit a hole 800 in the light-tray structure 210, and can be connected to the controller 130 that is placed in a component compartment that exists in a space between the light-tray structure 210 and the upper interior surface of the housing 102 (as shown in FIG. 1C).

Referring more generally to each of FIGS. 7 and 8, the antenna installations within a lighting component compartment that exists between the light-tray structure 210 and the diffuser 212 can serve to offer a visually appealing exterior profile for the integrated lighting device 100, while reducing an amount of machining to be performed on the housing 102. Further, a possibility that physical damage may occur to the antenna 120 can be reduced (e.g., damage that may occur as a result of the antenna 120 being located at an exterior of the device 100). Further, these benefits can be realized while maintaining wireless communication capabilities of the integrated lighting device 100 (e.g., by permitting radio frequency (RF) signals to be transmitted through the diffuser 212).

Referring now to FIG. 9A, a perspective view is shown of an exterior of an alternate example of an integrated lighting device. Similar to the integrated lighting device 100 (shown in previous figures), for example, integrated lighting device 900 can have a substantially cuboid shape, however the device 900 can have different exterior dimensions and a different layout of interior components relative to the device 100. In the present example, a housing 902 of the integrated lighting device can be fabricated from a material that is suitably light, sturdy, and damage-resistant, such as metal, plastic, wood, or another suitable material. Relative to the integrated lighting device 900, however, the device 900 can have a compact configuration, with a reduced length dimension (e.g., a foot, two feet, three feet, or another suitable length) and height dimension (e.g., an inch, two inches, three inches, or another suitable height), but possibly with an increased depth dimension (e.g., six inches, a foot, two feet, or another suitable depth). Further, rather than placing various electrical components (e.g., power supply, antenna, controller, various cables, etc.) in a compartment that is situated above (and optionally, below) a lighting unit, for example, the electrical components can be in a portion of the integrated lighting device 900 that is in a same horizontal plane as the lighting unit, thereby reducing a height dimension of the device 900. In the present example, an electrical component portion 952 (e.g., a rear compartment) of the integrated lighting device 900 can house the power supply, antenna, controller, and various cables, whereas a lighting portion 954 (e.g., a separate, front compartment) of the device can house the lighting device and the diffuser. Such a configuration, for example, can be advantageous in installation environments in which a reduced height factor is desirable, but an increased width factor is acceptable (e.g., under cabinet installations).

In some implementations, connections between components of the integrated lighting device 900 can be substantially similar to that of the integrated lighting device 100 (shown in previous figures). For example, a power cable can deliver high voltage power to the integrated lighting device 900, and can be connected to a power supply 110, which is in turn connected to a controller via a conductor cable. The controller, for example, can also be connected to an antenna via an antenna cable 122. Low-voltage power and lighting control signals can be provided to a lighting unit via a lighting unit cable 132. However, a component layout in the interior of the integrated lighting device 900 can be different from that of device 100.

In some implementations, an interior component layout of an integrated lighting device can include an integration of two or more components. For example, a power supply and a controller can be combined into a single component (and optionally, can be miniaturized). In the present example, the combined power supply/controller can receive wireless control signals via an antenna, and can receive high voltage power via a power cable. The wireless control signals can be received by the antenna, for example, through a panel of the electrical component portion 952 of the integrated lighting device 900 that is fabricated from a material (e.g., plastic or another suitable material) through which wireless signals can be transmitted. The combined power supply/controller, for example, can provide low voltage power and lighting control signals to a lighting unit of the integrated lighting device 900.

Figure 9C:
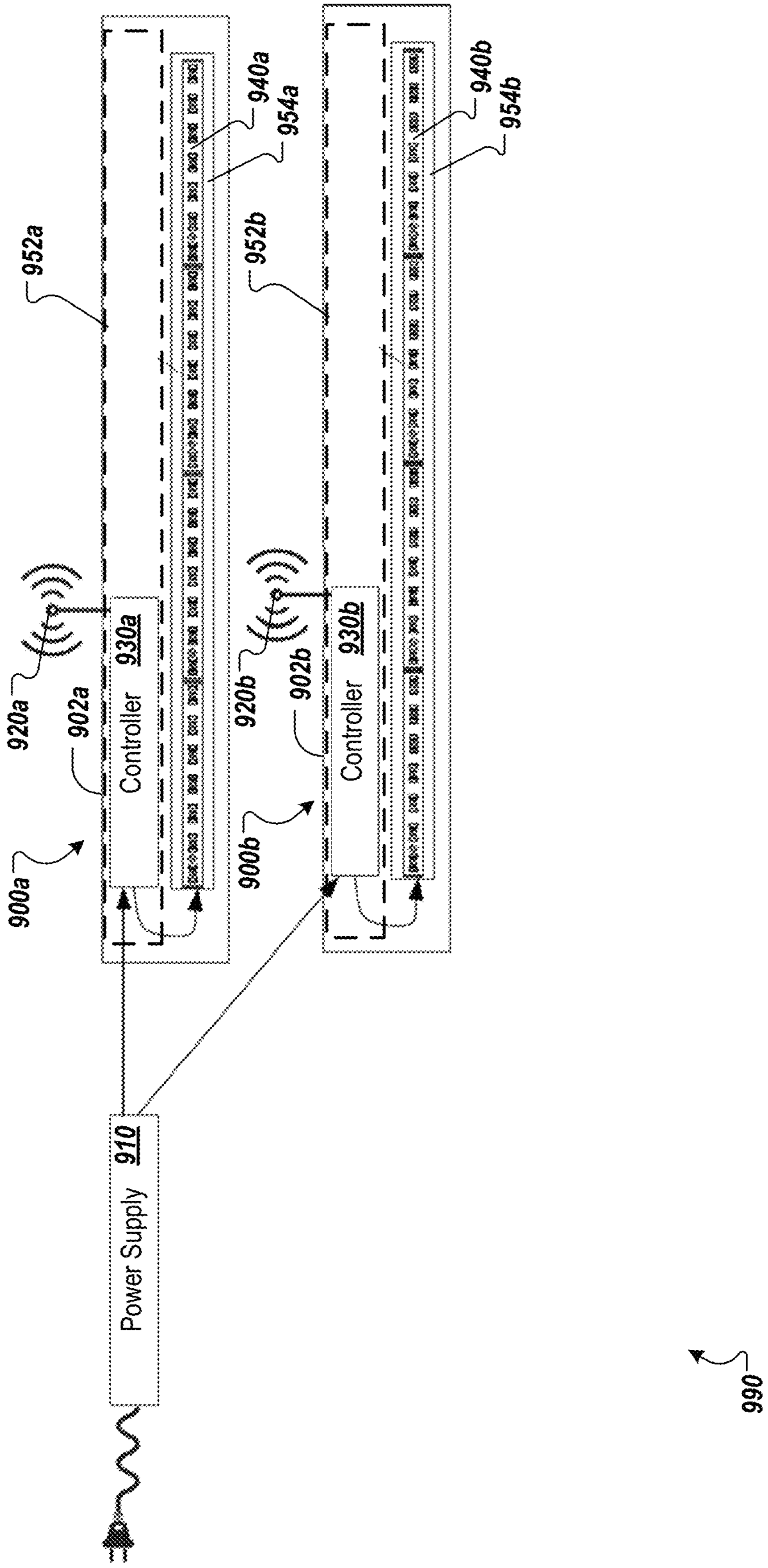

Referring now to FIG. 9B and FIG. 9C, conceptual diagrams of example lighting systems 950 and 990 are shown, with each of the systems 950, 990 including multiple integrated lighting devices. In the present examples, each of the systems 950, 990 include integrated lighting devices that are similar to that of the integrated lighting device 900 (shown in FIG. 9A), in that the devices shown in FIGS. 9B and 9C each include separate compartments for electronic components and for lighting components, with the separate compartments being in a same horizontal plane with respect to a device housing. However, in other examples, the integrated lighting devices can have different form factors and component layouts (e.g., as described in this document with respect to other examples of integrated lighting devices). Possible installation environments for such lighting systems 950, for example, can include residential or commercial spaces (e.g., kitchens, restrooms, living areas, offices, etc.), to provide lighting under cabinets, over cabinets, toe-kick areas (e.g., for fill and accent as well as for safety by providing a high-contrast visual queue for floor/cabinet delineation), or other suitable locations.

Referring specifically to FIG. 9B, the example lighting system 950 includes multiple integrated lighting devices (e.g., integrated lighting devices 900*a*, 900*b*). In the present example, each of the integrated lighting devices 900*a*, 900*b* can be physically and functionally similar to each other, however in other examples, at least some of the devices can have different configurations. The integrated lighting devices 900*a*, 900*b*, for example, can each include respective wiring junction boxes 908*a*, 908*b*, that are configured to receive line voltage (e.g., via respective power cables). The wiring junction boxes 908*a*, 908*b*, for example, can each be electrically connected to respective power supplies 910*a*, 910*b*, that are configured to convert line voltage to low-voltage power (e.g., similar to the power supply 110 described elsewhere in this document). The power supplies 910*a*, 910*b*, for example, can each be electrically connected to respective controllers 930*a*, 930*b*, that each include radio controller transceiver and light controller modules (e.g., similar to the controller 130 described elsewhere in this document). Each of the controllers 930*a*, 930*b*, for example, can be electrically connected to (or optionally, can include) respective antennas 920*a*, 920*b* (e.g., similar to the antenna 120 described elsewhere in this document). Referring specifically to the integrated lighting device 900*a*, for example, the wiring junction box 908*a*, the power supply 910*a*, the controller 930*a* (and optionally, the antenna 920*a*) can be located within the housing 902*a* of the integrated lighting device 900*a*, in an electrical component portion 952*a* (e.g., similar to the electrical component portion 952, shown in FIG. 9A) of the housing 902*a*. As another example, the antenna 920*a* can be located at an exterior of the housing 902*a*, or within the housing 902*a* and outside of the electrical component portion 952*a* (e.g., in a lighting portion).

Each of the integrated lighting devices 900*a*, 900*b* shown in the present example include respective lighting portions 954*a*, 954*b*, that are separate from the respective electrical component portions 952*a*, 952*b* of the respective housings 902*a*, 902*b*. Each of the lighting portions 954*a*, 954*b*, for example, can include respective lighting units 940*a*, 940*b* (e.g., similar to the lighting unit 140 described elsewhere in this document) that are configured to generate illumination based on lighting control signals received from the respective controllers 930*a*, 930*b*, and based on wireless signals received from the respective antennas 920*a*, 920*b*. Each of the lighting portions 954*a*, 954*b*, for example, can be covered by respective diffusers (e.g., similar to the diffuser 212 described elsewhere in this document), that protect the respective lighting units 940, 940*b* from the environment.

Referring specifically to FIG. 9C, the example lighting system 990 includes multiple integrated lighting devices (e.g., integrated lighting devices 900*a*, 900*b*), in an alternate configuration. As in FIG. 9B, in the present example, each of the integrated lighting devices 900*a*, 900*b* can be physically and functionally similar to each other, however in other examples, at least some of the devices can have different configurations. In contrast to the configuration shown in FIG. 9B, however, in the example lighting system 990 of FIG. 9C, each of the integrated lighting devices 900*a*, 900*b* can be electrically connected to an external power supply 910 that converts line voltage to low-voltage direct current (DC) power for use by the respective devices 900*a*, 900*b*. The low-voltage power delivered by the external power supply 910 (e.g., through respective conductor cables, such as the conductor cable 112 described elsewhere in this document), can be provided to respective controllers 930, 930*b*, that each include radio controller transceiver and light controller modules. Each of the controllers 930*a*, 930*b*, for example, can be electrically connected to (or optionally, can include) respective antennas 920*a*, 920*b* (e.g., similar to the antenna 120 described elsewhere in this document). Referring specifically to the integrated lighting device 900*a* of the present example of FIG. 9C, the controller 930*a* (and optionally the antenna 920*a*) can be located within the housing 902*a* of the integrated lighting device 900*a*, in an electrical component portion 952*a* (e.g., similar to the electrical component portion 952, shown in FIG. 9A) of the housing 902*a*. As another example, the antenna 920*a* can be located at an exterior of the housing 902*a*, or within the housing 902*a* and outside of the electrical component portion 952*a* (e.g., in a lighting portion).

Similar to the configuration shown in FIG. 9B, in the example lighting system 990 of FIG. 9C, each of the integrated lighting devices 900*a*, 900*b* can include respective lighting portions 954*a*, 954*b*, that are separate from the respective electrical component portions 952*a*, 952*b* of the respective housings 902*a*, 902*b*. Each of the lighting portions 954*a*, 954*b*, for example, can include respective lighting units 940*a*, 940*b* (e.g., similar to the lighting unit 140 described elsewhere in this document) that are configured to generate illumination based on lighting control signals received from the respective controllers 930*a*, 930*b*, and based on wireless signals received from the respective antennas 920*a*, 920*b*. Each of the lighting portions 954*a*, 954*b*, for example, can be covered by respective diffusers (e.g., similar to the diffuser 212 described elsewhere in this document), that protect the respective lighting units 940, 940*b* from the environment.

Referring again to FIG. 9B, for example, various remote control sources are shown for providing wireless control commands for integrated lighting devices. In general, the remote control sources (e.g., remote control sources 980*a*, 980*b*, which can be functionally similar to the remote control sources 180*a*, 180*b* described with respect to FIGS. 1B and 1C) can be configured to control various lighting effects of any of the integrated lighting devices described herein, such as turning a light source on or off, changing an intensity and/or color of emitted light, and so forth. The remote control source 980*a*, for example, can represent a stationary control unit (e.g., a wall unit located within a building). The remote control source 980*b*, for example, can represent a mobile computing device (e.g., a smartphone, personal digital assistant, tablet, laptop, or another sort of mobile computing device) that is configured to execute a lighting control application.

In the present example, a control hub/bridge 982 can be configured to provide connectivity to a network (e.g., a wireless personal area network (PAN), or another sort of local network) of a building (e.g., a residence, a commercial space, etc.). Using the network connection, for example, external lighting control can be provided through a building automation system, or through a mobile computing device (e.g., the remote control source 980*b*) that is internal or external to the building. For example, the remote control source 980*b* (or another sort of computing device) can be configured to execute a lighting control application that relays controls via the Internet, into the local network of the building, and to the integrated lighting devices 900*a*, 900*b* via the control hub/bridge 982. The control hub/bridge 982, for example, can be an optional component of the lighting system 950, and not necessarily needed for system functionality.

In some implementations, integrated lighting devices may be controlled through a mesh network. For example, each of the integrated lighting devices 900*a*, 900*b* (or integrated lighting devices having a different configuration) can be included in a radio frequency (RF) mesh network to create a network of devices that can act individually or as a group, with wireless control signals linking the separate devices. The integrated lighting devices 900*a*, 900*b*, for example, can be configured to operate as a group (e.g., with each device receiving similar control signals and generating similar lighting effects), as a member of a zone (e.g., with the devices of each zone receiving similar control signals and generating similar lighting effects, which may be different from that of devices of other zones), or as an individual unit (e.g., with each device receiving different control signals and generating different lighting effects). Rather than using the control hub/bridge 982 to coordinate lighting commands, for example, the mesh network can coordinate the lighting commands. For example, a first integrated lighting device that powers up (e.g., device 900*a*) can be established as a primary mesh controller. In the present example, as additional integrated lighting devices power up (e.g., device 900*b*, etc.), the additional devices can be subordinate to the primary mesh controller, by receiving control commands from the primary mesh controller, and relaying the control commands to adjacent integrated lighting devices (if included in the system 950).

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. An integrated lighting device, comprising:

a housing;

a lighting unit within the housing, the lighting unit including a plurality of light emitting diodes (LEDs);

a high-voltage power cable that is configured to provide high-voltage power from a high-voltage power source to the integrated lighting device;

a power supply within the housing, the power supply being configured to receive the high-voltage power provided through the high-voltage power cable and to convert the high-voltage power into low-voltage power;

an antenna within the housing, the antenna being configured to wirelessly receive control signals from a remote control source;

a controller within the housing, the controller being configured to (i) receive low-voltage power from the power supply, (ii) provide the low-voltage power to the lighting unit, (iii) receive control signals from the antenna, and (iv) based on the control signals, provide corresponding lighting control commands to the lighting unit;

wherein the power supply and the controller are located at opposite ends of the housing; and wherein the lighting unit is configured to generate lighting effects based on the lighting control commands provided by the controller, using the low-voltage power provided by the controller.

2. The integrated lighting device of claim 1, wherein the housing is fabricated from extruded aluminum.

3. The integrated lighting device of claim 1, wherein the housing is fabricated from rigid fiberglass.

4. The integrated lighting device of claim 1, wherein the housing has a substantially cuboid shape, with a length dimension being a greatest dimension of the housing, and with a height dimension and a width dimension both being lesser dimensions relative to the length dimension.

5. The integrated lighting device of claim 4, wherein the power supply and the controller are located in an upper compartment of the housing, and wherein the lighting unit is located in a lower compartment of the housing that is situated below the upper compartment of the housing.

6. The integrated lighting device of claim 5, further comprising:

a removable light tray structure configured to be installed within the housing, the light tray structure extending along the length of the housing, and forming the upper compartment of the housing and the lower compartment of the housing when installed.

7. The integrated lighting device of claim 6, further comprising:

a removable diffuser that extends along the length of the light tray structure, and that is configured to be removably attached to the light tray structure and to cover the lighting unit.

8. The integrated lighting device of claim 7, wherein the antenna is located in the lower compartment of the housing, in a space that is formed between the removable diffuser and the removable light tray structure.

9. The integrated lighting device of claim 6, wherein the lighting unit is a flexible LED strip that extends along the length of the light tray structure, and is chemically adhered to the light tray structure.

10. The integrated lighting device of claim 6, wherein the lighting unit comprises a series of rigid printed circuit boards (PCBs) that are mechanically coupled to the light tray structure.

11. The integrated lighting device of claim 6, wherein the housing is fabricated from a semi-flexible material, wherein the removable light tray structure has a tension fit within the housing when installed.

12. The integrated lighting device of claim 6, wherein the removable light tray structure is mechanically coupled to the housing when installed.

13. The integrated lighting device of claim 12, wherein a mechanical coupling mechanism between the housing and the removable light tray structure comprises a series of locking cams that mechanically couple the removable light tray structure to the housing.

14. The integrated lighting device of claim 1, wherein the controller is configured to support multiple different channels of lighting control for the lighting unit, and is configured to support dimming levels between 0.1% and 100%.

15. The integrated lighting device of claim 5, wherein the power supply and the controller are each removably affixed to an interior surface of the upper compartment of the housing.

16. The integrated lighting device of claim 1, further comprising:

a pair of removable endcaps, with each endcap being removably attached to an opposite end of the housing.

17. The integrated lighting device of claim 6, wherein the power supply and the controller are each removably affixed to a top of the removable light tray structure.

* * * * *